US011552828B2

(12) United States Patent
Schelstraete et al.

(10) Patent No.: US 11,552,828 B2
(45) Date of Patent: Jan. 10, 2023

(54) BEAMFORMER SOLICITED SOUNDING

(71) Applicant: SEMICONDUCTOR COMPONENTS INDUSTRIES, LLC, Phoenix, AZ (US)

(72) Inventors: Sigurd Schelstraete, Menlo Park, CA (US); Hossein Dehghan, Diablo, CA (US); Debashis Dash, Newark, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 108 days.

(21) Appl. No.: 17/037,313

(22) Filed: Sep. 29, 2020

(65) Prior Publication Data

US 2021/0028962 A1 Jan. 28, 2021

Related U.S. Application Data

(63) Continuation-in-part of application No. 16/403,073, filed on May 3, 2019.
(Continued)

(51) Int. Cl.
*H04L 25/02* (2006.01)
*H04B 7/0456* (2017.01)
*H04B 7/06* (2006.01)

(52) U.S. Cl.
CPC ....... *H04L 25/0226* (2013.01); *H04B 7/0456* (2013.01); *H04B 7/0617* (2013.01); *H04B 7/0626* (2013.01)

(58) Field of Classification Search
CPC . H04L 25/0226; H04B 7/0456; H04B 7/0617; H04B 7/0619; H04B 7/0621; H04B 7/0626; H04B 7/0628; H04W 84/12
(Continued)

(56) References Cited

U.S. PATENT DOCUMENTS 9,154,969 B1 10/2015 Srinivasa et al.
9,843,097 B1 12/2017 Zhang et al.
(Continued)

FOREIGN PATENT DOCUMENTS

EP 3261380 A1 12/2017
EP 3189609 B1 9/2020
(Continued)

OTHER PUBLICATIONS

International Search Report for counterpart PCT Application No. PCT/US2019/030711, dated Jul. 23, 2019, 5 pages.
(Continued)

*Primary Examiner* — Candal Elpenord
(74) *Attorney, Agent, or Firm* — Maschoff Brennan

(57) ABSTRACT

Example implementations are directed to methods and systems employing a solicited sounding protocol that includes receiving, by a second access point, a sounding trigger broadcast by a first access point. The methods and systems also include receiving, by the second access point, a dedicated training signal from a first station in response to the sounding trigger broadcast by the first access point, and generating, by the second access point, channel characteristics of a channel based on the first dedicated training signal, the channel including a forward channel between the second access point and the first station.

17 Claims, 24 Drawing Sheets

Related U.S. Application Data

(60) Provisional application No. 62/932,998, filed on Nov. 8, 2019, provisional application No. 62/667,405, filed on May 4, 2018.

(58) Field of Classification Search
USPC .................................................... 370/338
See application file for complete search history.

(56) References Cited

U.S. PATENT DOCUMENTS

| | | |
|---|---|---|
| 2008/0095268 A1 | 4/2008 | Aldana |
| 2010/0322166 A1 | 12/2010 | Sampath et al. |
| 2011/0051636 A1 | 3/2011 | Van Nee et al. |
| 2011/0261708 A1 | 10/2011 | Grandhi et al. |
| 2012/0099530 A1 | 4/2012 | Morioka et al. |
| 2012/0328034 A1 | 12/2012 | Nabar et al. |
| 2013/0286959 A1 | 10/2013 | Lou et al. |
| 2014/0098701 A1 | 4/2014 | Sohn et al. |
| 2015/0094103 A1 | 4/2015 | Wang et al. |
| 2015/0146807 A1 | 5/2015 | Zhang et al. |
| 2015/0270879 A1* | 9/2015 | Chen ............... H04W 24/08 375/267 |
| 2015/0382333 A1 | 12/2015 | Seok |
| 2016/0233932 A1 | 8/2016 | Hedayat et al. |
| 2016/0255603 A1 | 9/2016 | Vankatraman et al. |
| 2016/0330732 A1 | 11/2016 | Moon et al. |
| 2017/0195016 A1 | 7/2017 | Alexander et al. |
| 2018/0206274 A1* | 7/2018 | Cherian ............ H04W 74/0858 |
| 2018/0310133 A1 | 10/2018 | Ramasamy et al. |
| 2018/0310273 A1* | 10/2018 | Chu ..................... G01S 5/0236 |
| 2019/0020505 A1* | 1/2019 | Hoffman ............ H04L 25/0228 |
| 2019/0041509 A1 | 2/2019 | Jiang et al. |
| 2019/0081664 A1* | 3/2019 | Vermani ............. H04B 7/0456 |
| 2019/0132762 A1* | 5/2019 | Zhu ....................... H04B 7/024 |

FOREIGN PATENT DOCUMENTS

| | | |
|---|---|---|
| WO | 2016140872 A1 | 9/2016 |
| WO | 2019023173 A1 | 1/2019 |

OTHER PUBLICATIONS

Samsung, "Discussion on beam indication for UL transmission," 3rd Generation Partnership Project (3GPP) TSG RAN WG1 Meeting 90bis, Prague, Czech Republic, R1-1717620, Oct. 9-13, 2017, 3 pages.

\* cited by examiner

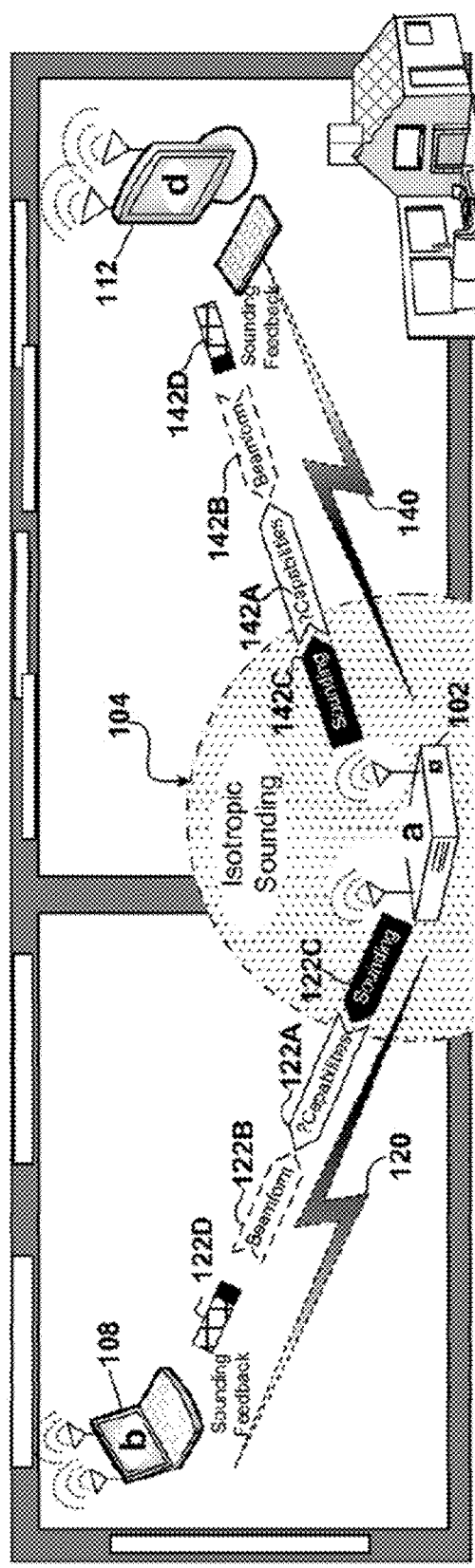
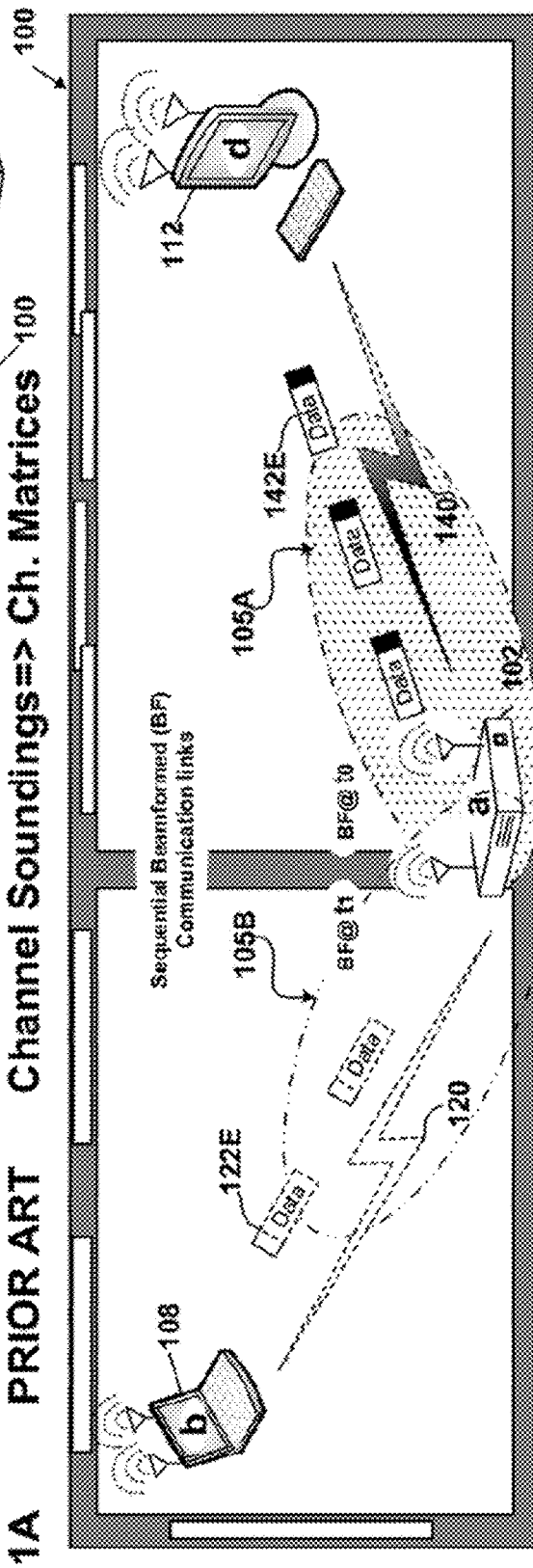
FIG. 1A   PRIOR ART   Channel Soundings => Ch. Matrices
FIG. 1B   PRIOR ART   MIMO BeamSteered Communications <= Ch. Matrices

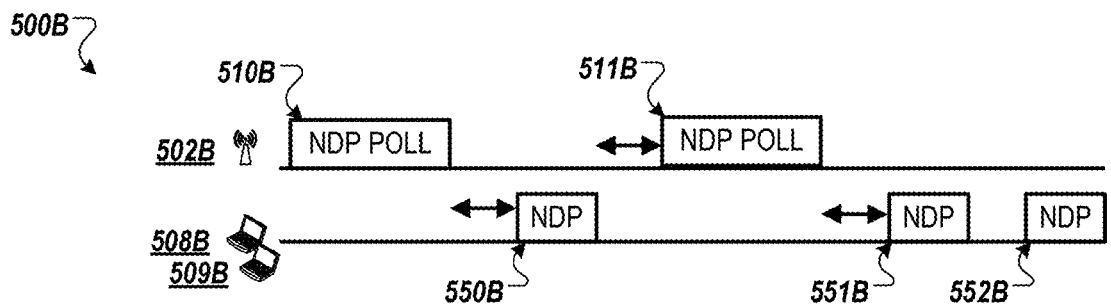
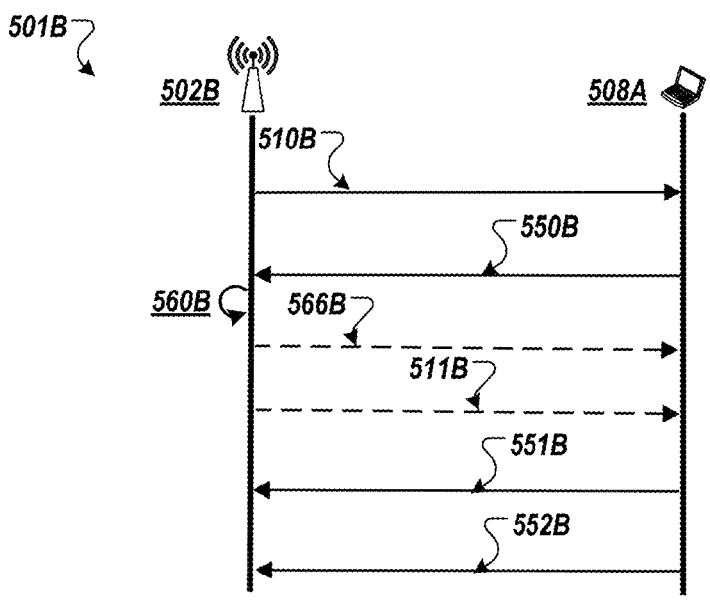
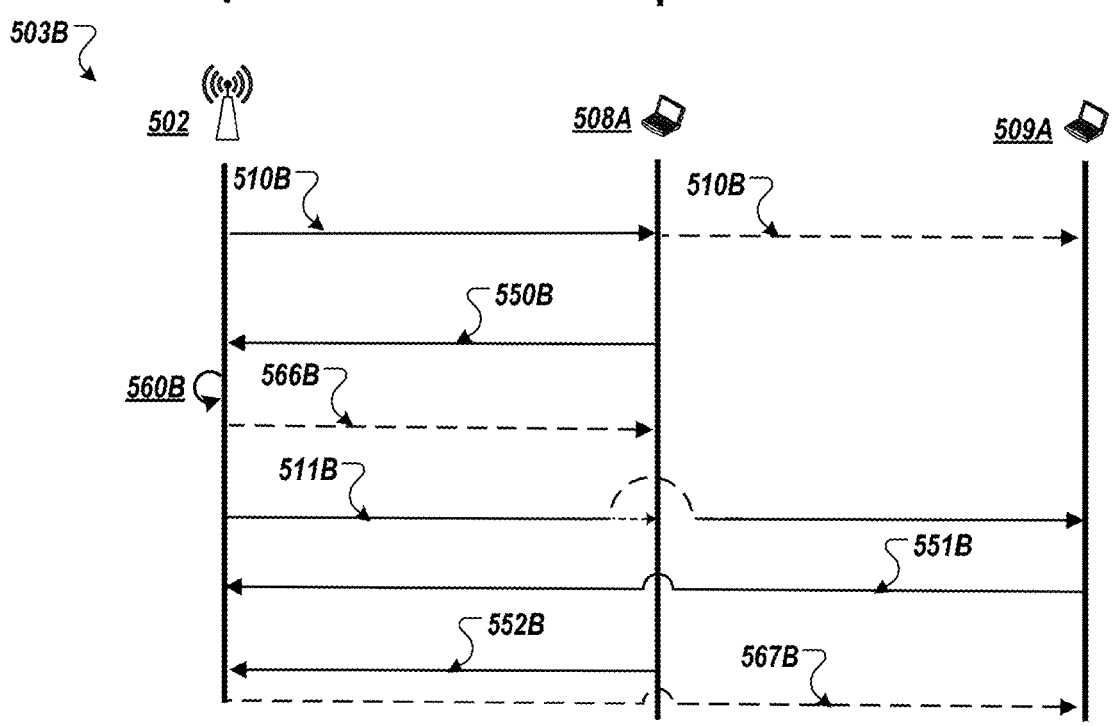
FIG. 5B

BEAMFORMER SOLICITED SOUNDING

CROSS REFERENCE TO RELATED APPLICATION

This application claims the benefit of prior filed co-pending application Ser. No. 16/403,073 filed at the United States Patent and Trademark Office on May 3, 2019 entitled "BEAMFORMER SOLICITED SOUNDING," which claims the benefit of Provisional Application No. 62/667,405 filed at the United States Patent and Trademark Office on May 4, 2018 entitled "BEAMFORMER SOLICITED SOUNDING," both of which are incorporated by reference herein in their entireties. This application also claims the benefit of prior filed co-pending Application No. 62/932,998 filed at the United States Patent and Trademark Office on Nov. 8, 2019 entitled "MULTI-ACCESS POINT BEAMFORMER SOLICITED SOUNDING," which is incorporated by reference herein in its entirety.

FIELD

Aspects of the present disclosure relate in general to sounding for wireless communications operations and specifically to systems and methods for beamformer solicited sounding and operations thereof.

BACKGROUND

Home, outdoor, and office networks, a.k.a. wireless local area networks (WLAN) are established using a device called a Wireless Access Point (WAP). The WAP may include a router. The WAP wirelessly couples all the devices of the home network, e.g., wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented (e.g., "a", "b", "g", "n", "ac", "ad"). Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology for sharing a single communication medium, by having a contending communication device back off and retry access if a collision on the wireless medium is detected (e.g., if the wireless medium is in use).

Communications on the single communication medium are identified as "simplex" meaning, one communication stream from a single source node to one or more target nodes at one time, with all remaining nodes capable of "listening" to the subject transmission. Starting with the IEEE 802.1 lac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with single antenna single stream or multiple-antenna multi-stream transceivers concurrently, thereby increasing the time available for discrete MIMO video links to wireless HDTVs, computers tablets and other high throughput wireless devices the communication capabilities of which rival those of the WAP. The IEEE 802.11ax standard integrates orthogonal frequency division multiple access (OFDMA) into the WAP or stations capabilities. OFDMA allows a WAP to communicate concurrently on a downlink with multiple stations, on discrete frequency ranges, identified as resource units.

The IEEE 802.11n and 802.11ac standards support increasing degrees of complexity in the signal processing required of fully compliant WLAN nodes including beamforming capability for focused communication of user data. In order to characterize the multipath communication channel between the WAP and each station a MIMO sounding is conducted. An explicit sounding as specified in the IEEE 802.11n and 802.11ac standards consists of the transmission of a known sequence of packets from the WAP to each associated station, then each associated station processes the sequence of packets to perform measurements and calculations to generate a detailed sounding response from the station characterizing the communication channel between the WAP and itself. The WAP traditionally uses the explicit sounding response to focus its MIMO antennas in a manner which improves either or both signal strength at the station or downlink throughput thereto.

With the growing variety and number of stations on a wireless network, there is increasing need for improved sounding processes that can efficiently coordinate communication services to a larger number of devices while decreasing transmission overhead from sounding and the processing overhead required for sounding stations.

SUMMARY

Methods and systems employing a solicited sounding protocol that includes an efficient communication sequence, improves bandwidth for sounding dialog, and reduces processing required by beamformees among other benefits. In an example, a transmitter determines a sounding control scheme for one or more receivers, transmits a sounding trigger to the one or more receivers based on the sounding control scheme, receives at least one dedicated training signal from the one or more receivers in response to the sounding trigger, and for each received dedicated training signal, the transmitter estimates forward channel state information (CSI) derived based on the dedicated training signal from an associated receiver.

Example implementations include methods and systems for operating a wireless transceiver include transmitting a sounding trigger to one or more beamformees via a forward channel, receiving at least one dedicated training signal from the one or more beamformees via a reverse channel in response to the sounding trigger, and for each of the received dedicated training signal. The method also includes estimating forward CSI derived based on the dedicated training signal from an associated beamformee, and subsequent packets can be precoded with precoding derived from the forward CSI for transmission to the associated beamformee via the forward channel.

Example implementations include methods and systems with a wireless transceiver apparatus for a wireless local area network supporting wireless communications, and the wireless transceiver apparatus including a plurality of antenna. The wireless transceiver apparatus also includes a plurality of components coupled to one another to form transmit and receive chains; and a solicitor module circuit to transmit a sounding trigger, via a forward channel, to solicit multiple dedicated training signal from one or more beamformees, and the dedicated training signals are to be processed for estimating a forward CSI for transmission of subsequent packets to associated beamformee.

Example implementations include methods and systems for operating a wireless transceiver including transmitting a sounding trigger to one or more beamformees via a forward channel, receiving at least one dedicated training signal with timing information from the one or more beamformees via a reverse channel in response to the sounding trigger, and for each received dedicated training signal. The method also includes estimating a forward channel state information derived based on the dedicated training signal from an associated beamformee; and where subsequent packets are precoded with precoding derived from the forward CSI for transmission to the associated beamformee via the forward channel, and determining packet transmit and receive timestamps based on the timing information. Other embodiments of this aspect include corresponding communication protocols, networking systems, apparatus, and computer programs recorded on one or more computer storage devices, each configured to perform the actions of the methods.

Example implementations include methods and systems employing a solicited sounding protocol that includes multiple beamformers benefitting from a single sounding trigger. For example, such a method may include receiving, by a second access point, a sounding trigger broadcast by a first access point. The methods and systems also include receiving, by the second access point, a dedicated training signal from a first station in response to the sounding trigger broadcast by the first access point, and generating, by the second access point, channel characteristics of a channel based on the first dedicated training signal, the channel including a forward channel between the second access point and the first station.

Example implementations include methods and systems that include opportunistically monitoring for a sounding trigger from a separate access point without coordination with the separate wireless access point. The methods and systems also include observing the sounding trigger from the separate access point, and receiving a first dedicated training signal from a first station generated in response to the sounding trigger. The methods and systems additionally include generating first channel characteristics regarding a first channel based on the first dedicated training signal, the first channel including communication between the access point and the first station.

Example implementations include methods and systems that include operation of a beamformee in the context of solicited sounding. The methods and systems include receiving a sounding trigger from a first beamformer, and transmitting a dedicated training signal to multiple beamformers in response to the sounding trigger from the first beamformer. The methods and systems may also include receiving beamformed communications from each of the multiple beamformers, where each of the communications are beamformed based on the transmitted dedicated training signal.

The methods and systems are implemented using one or more networking devices and/or systems. Other features and advantages of the present inventive concept will become more readily apparent to those of ordinary skill in the art after reviewing the following detailed description and accompanying drawings.

BRIEF DESCRIPTION OF THE DRAWINGS

The structure and operation of the example implementations will be understood from a review of the following detailed description and the accompanying drawings in which like reference numerals refer to like parts and in which:

FIGS. 1A-B illustrate prior art examples of WLAN channel sounding and beamformed communications.

FIGS. 5A-G illustrate example sequences of solicited sounding in accordance with various example implementations.

DETAILED DESCRIPTION

Figure 2A:
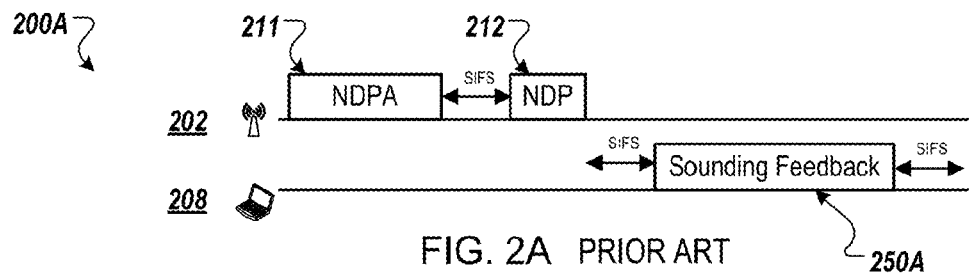
FIGS. 2A-D illustrate prior art sounding and packet diagram examples.

The following detailed description provides further details of the figures and example implementations of the present application. Reference numerals and descriptions of redundant elements between figures are omitted for clarity. Terms used throughout the description are provided as examples and are not intended to be limiting.

Traditional explicit sounding approaches start with a beamformer (e.g., access point, transmitter, etc.) sending a pair of packets with an announcement frame and dedicated training signal (e.g., a Null Data Packet Announcement (NDPA) followed by a null data packet (NDP)) to a beamformee (e.g., station, client, receiver, etc.) so that the beamformee can measure the received dedicated training signal for characteristics of the forward communication channel (e.g., from the beamformer to the beamformee). The beamformee then traditionally generates a detailed sounding feedback payload that is returned to the beamformer. The beamformer traditionally uses the returned sounding feedback to determine precoding that can be used for subsequent transmissions to the beamformee. The beamformer uses the sounding feedback to improve subsequent transmissions.

In the complex multi-path channel environment encountered by multiple input multiple output (MIMO) transmissions the feedback of link channel matrices consumes a considerable amount of airtime due to amount of data that has to be transmitted to characterize the multipath channel and a low modulation and coding schema (MCS) at which the conventional detailed sounding feedback is transmitted consuming considerable network resources. Thus, each explicit sounding consumes precious airtime of the network.

Since explicit sounding uses sounding feedback for the forward channel to determine precoding for the forward channel, explicit sounding is generally more accurate than estimating the forward channel based on the reverse channel as in implicit sounding. However, explicit sounding generally requires additional overhead and the sounding feedback received from beamformee can be rather large and thus reduces availability of airtime for other transmissions.

Traditional implicit sounding approaches start with a beamformee opportunistically sending packets to the beamformer so that the beamformer can measure the received packets to determine characteristics of the reverse channel information (e.g., from the beamformee to the beamformer) that are then used to attempts to estimate the forward channel back to the beamformee. However, traditional implicit sounding fails to manage sounding among several beamformees in an efficient coordinated framework. For example, since in traditional implicit sounding approaches the beamformee controls initiation of a sounding process, the beamformer is unable to update the CSI as data communications degrade. Further, the beamformee in implicit sounding approaches is only interested in its own sounding process and fails to account for the sounding needs of other station or network resources over time.

With the growing variety and number of nodes on a wireless network, there is increasing need for improved sounding protocols that can efficiently coordinate communication services to a larger number of devices while decreasing transmission overhead from sounding and the processing overhead for sounding required by client nodes (e.g., beamformees).

Aspects of example implementations described herein relate to systems and methods for a solicited sounding framework that is initially initiated by the beamformer, requires minimal processing resources by the beamformees, and can coordinate multiple soundings sequences among several beamformees. The solicited sounding framework provides improved transmission overhead for sounding and reduces the processing overhead for sounding required by beamformees. In an example implementation described herein, a beamformer transmits a sounding trigger to solicit a dedicated training signal frame from the beamformee. A sounding trigger is a packet sent by a transmitter to at least one targeted station that instructs the station(s) to send one or more dedicated training signals to the transmitter. A single sounding trigger can indicate for the station to send a number of dedicated training signals and/or a schedule for sending the dedicated training signals along with other configurable parameters related to the dedicated training signals or transmission thereof. A single sounding trigger can also indicate for multiple stations to send a number of dedicated training signals.

A dedicated training signal is a packet sent by a beamformee to the beamformer that does not require a payload. A transmitted dedicated training signal can be processed to estimate channel information between a sender and recipient. The beamformee processes sounding trigger and responds with one or more dedicated training signals to be sent at coordinated times based on the instructions indicated by the sounding trigger.

The beamformer can receive multiple responses to a single sounding trigger without additional prompting of beamformees. The sounding trigger can include additional instructions for responding and does not require the beamformer to send an announcement packet with the sounding trigger or prompting for additional dedicated training signals. The beamformee responds to the sounding trigger with one or more dedicated training signal based on the instructions accompanying the trigger. The dedicated training signal requires substantially less overhead than traditional sounding feedback.

Example aspect of the solicited sounding framework include an efficient sounding sequence between an access point and one or more stations by reducing the number of transmissions to initiate soundings as well as the amount of bandwidth or airtime for determining CSI for the forward channel as compared to explicit sounding.

In the solicited sounding framework, the beamformee (e.g., a station, receiver, etc.) sends the dedicated training signal to a beamformer (e.g., an access point, transmitter, a transceiver station, etc.) that can be processed to estimate reverse channel information about the channel in the direction of the beamformee to the beamformer. The beamformer measures the received dedicated training signal to determine characteristics of the reverse channel information (e.g., from the beamformee to the beamformer) that are then used to attempts to estimate the forward channel back to the beamformee.

The solicited sounding framework has improved performance and efficiency over traditional explicit sounding and traditional implicit sounding. For example, the solicited sounding framework uses a single sounding trigger rather than requiring the beamformer to send multiple packets (e.g., NDPA and NDP) and prompts. Further, the dedicated training signal allows the beamformee to respond with minimal processing and bandwidth rather than requiring measurement of the channel, generation of detailed sounding feedback, and transmission of a large set of detailed sounding feedback (e.g., compressed feedback reports) that can consume significant processing and network resources.

Moreover, the solicited sounding framework allows the beamformer to initiate the sounding process and coordinate several dedicated training signals from multiple beamformees over a period of time rather than sending several prompts or waiting for the beamformee to opportunistically send packets. Additional aspects of the solicited sounding framework, as discussed herein, include coordinated sounding for several receivers with different capabilities, configurable sounding characteristics, integrated ranging capabilities, etc.

In an example implementation, a wireless transceiver transmits a sounding trigger to one or more beamformees via a forward channel, receives at least one dedicated training signal from the one or more beamformees via a reverse channel in response to the sounding trigger. For each of the received dedicated training signal, the transceiver estimates forward CSI derived based on the dedicated training signal from an associated beamformee to improve transmission of subsequent communications of data an associated beamformee (e.g., data packets precoded with precoding derived from the forward CSI for transmission to the associated beamformee via the forward channel).

The solicited sounding framework enables improved quality of data communications by instructing the beamformee to send multiple dedicated training signals over time without additional prompts so that the beamformer can use the multiple dedicated training signals to re-sound the link with updated CSI. Further, the beamformer can send updated sounding triggers to maintain coordinated sounding sequences with the one or more beamformees to efficiently maintain communication links within the network. In an example, the beamformer sends another sounding trigger in response to detecting changes in transmission quality, network resources, or performance of one or more of the beamformees. For example, as data communications degrade with one or more of the beamformees, the beamformer can send another sounding trigger to update a sounding interval or training signal format indicated by a previous sounding trigger.

In other example implementations, the efficiencies of the solicited sounding framework can be utilized for streamlining or supporting other networking applications (e.g., motion tracking, building automation, etc.) in addition to sounding. In an example, the transmission between the beamformer and beamformee of the solicited sounding framework can be adapted to efficiently synchronize timing between stations, ranging functions, etc.

In addition to implementations involving a single beamformer, the present disclosure includes implementations of multiple beamformers that may benefit from the solicited sounding framework. For example, a single beamformer may send a sounding trigger via a forward channel to a beamformee and multiple beamformers may receive the dedicated training signal from the beamformee via reverse channels that is sent in response to the sole sounding trigger. When receiving the dedicated training signal, each of the beamformers can estimate their own respective forward CSIs derived based on the dedicated training signal from the beamformee to improve transmission of subsequent communications of data to the beamformee (e.g., data packets precoded with precoding derived from the respective forward CSIs for transmission to the beamformee via the forward channels).

In some implementations, the beamformers may operate in a coordinated manner, such that a single beamformer sends the sounding trigger on behalf of multiple beamformers who are listening for the dedicated training signal. For example, one beamformer may operate as a master and always send the sounding trigger, or may send a schedule or direction of which beamformers are to send the sounding triggers and at what times the sounding triggers are to be sent.

In some implementations, an opportunistic beamformer may have no relationship with another beamformer that sends the sounding trigger. The opportunistic beamformer may monitor for sounding triggers from other beamformers, and when one is observed, may listen for the dedicated training signal that is sent from a beamformee in response to the sounding trigger from the other beamformer. In such an implementation, the opportunistic beamformer can use the dedicated training signal to estimate a forward CSI to the beamformee without ever sending a sounding trigger while still avoiding some of the shortcomings of traditional implicit sounding.

FIGS. 1A-B illustrate prior art examples of WLAN channel sounding and beamformed communications. FIG. 1A illustrate channel soundings with intermittent sounding packages sent from the WAP identifying one or more station nodes from which prior art sounding feedback is requested. Traditional soundings packages include multiple elements including an announcement packet with a probe packet (e.g., an NDP sounding packet). The response to each intermittent sounding packages from the recipient station node contains detailed information that quantify the characteristics of the channel between it and the station node. The transmitter processes this detailed information. Soundings packages, whether sent from a device with a single antenna or multiple antenna, exhibit RF signal strengths to allow the recipient device to identify the link channel characteristics.

In FIG. 1A the WAP 102 is shown setting up communication links 120 and 140 with wireless station nodes 108 and 112 respectively within location 100. Each link pair exchanges capabilities, (e.g., 122A-B on link 120 and capabilities exchange, 142A-B on link 140). During this exchange the number of antenna, the number of streams, the coding and beamforming support capabilities of each device are exchanged. Next an initial explicit sounding request and response takes place, 122C-D on link 120 and 142C-D on link 140. The sounding package is sent using a radio frequency (RF) signal strength 104. Upon receipt of the sounding package, the recipient station(s) determine changes in amplitude and phase to the sounding transmission brought about the link channel e.g. fading, attenuation, and phase shift and passes indicia of these channel characteristics as detailed sounding feedback response packet(s), 122D. 142D, back to the WAP where they are immediately used to set up beamforming of subsequent data communications as shown in FIG. 1B.

The IEEE 802.11n and 802.11ac standards support increasing degrees of complexity in the signal processing required of fully compliant WLAN nodes including beamforming capability for focused communication of user data. One of the many capabilities of a fully compliant WLAN node under either of these standards is the ability to focus the signal strength of a transmitted communication toward a receiving device. Doing so requires multiple antenna and means for independently controlling the phase and amplitudes of the communication signals transmitted thereon. A baseband component of the WAP or station called a spatial mapper takes as input the independent communication streams for each antenna together with a steering matrix, a.k.a. beamforming matrix, determined during a prior sounding of the channel as shown in FIG. 1A. The steering matrix contains complex coefficients corresponding to the discrete phase and amplitude adjustments to each antenna's communication streams which provide the required focused signal strength to the composite of the signals transmitted from all antennas. The steering matrix used for subsequent transmissions is derived from the prior sounding as shown in FIG. 1A.

In FIG. 1B the WAP is shown using the sounding feedback to set up subsequent data communications with its link partners, e.g. stations 108, 112. Based on supported capabilities of the transmitter and receiver, the detailed sounding feedback is used to establish subsequent beamformed data communications. Beamforming increases the received signal strength and is achieved by independent changes in phase and or amplitude of the signal transmitted from each of the transmit antennas which collectively steer the transmit power footprint toward the intended recipient station(s), using the CSI obtained in the detailed sounding feedback response packets (See e.g., 122D, 142D of FIG. 1A).

A detailed sounding feedback response packet is typically received in response to each sounding package. WAP 102 is illustrated at time to using multiple antenna to beamform 105A downlink data communication packets 142E on link 140 to station 112. Subsequently at time ti WAP 102 is illustrated beamforming 105B downlink data communication packets 122E on link 120 to station 112.

FIGS. 2A-D illustrate prior art examples of sounding and a packet diagram. FIG. 2A illustrates a Prior Art sounding diagram. Wireless communication protocols prescribe that packet headers include various preamble fields with known sequences to allow a receiving station to synchronize reception with packet boundaries and to determine the received channel. A typical operation of a WAP includes transmitter and receiver sounding sequence that starts with a pair of packets (e.g., an announcement and an NDP) that can be sent periodically (e.g. at 100 millisecond intervals) to start a sounding sequence, followed by a Short Interframe Space (SIFS), and a sounding response. During the sounding sequence one or more downstream or upstream links are probed to determine the channel characteristics thereof and using the CSI in the feedback from the sounding the beamforming matrix for each link subject to the sounding is determined. The soundings are conducted on a per link basis, and further may be either a downlink or an uplink sounding. The sounding feedback is different for each link. During the contention based interval carrier sense multiple access (CSMA) is used as a medium access control (MAC) methodology to allow any station to seize control of the channel and send uplink user data communications thereon to the transmitter 202.

Figure 2B:
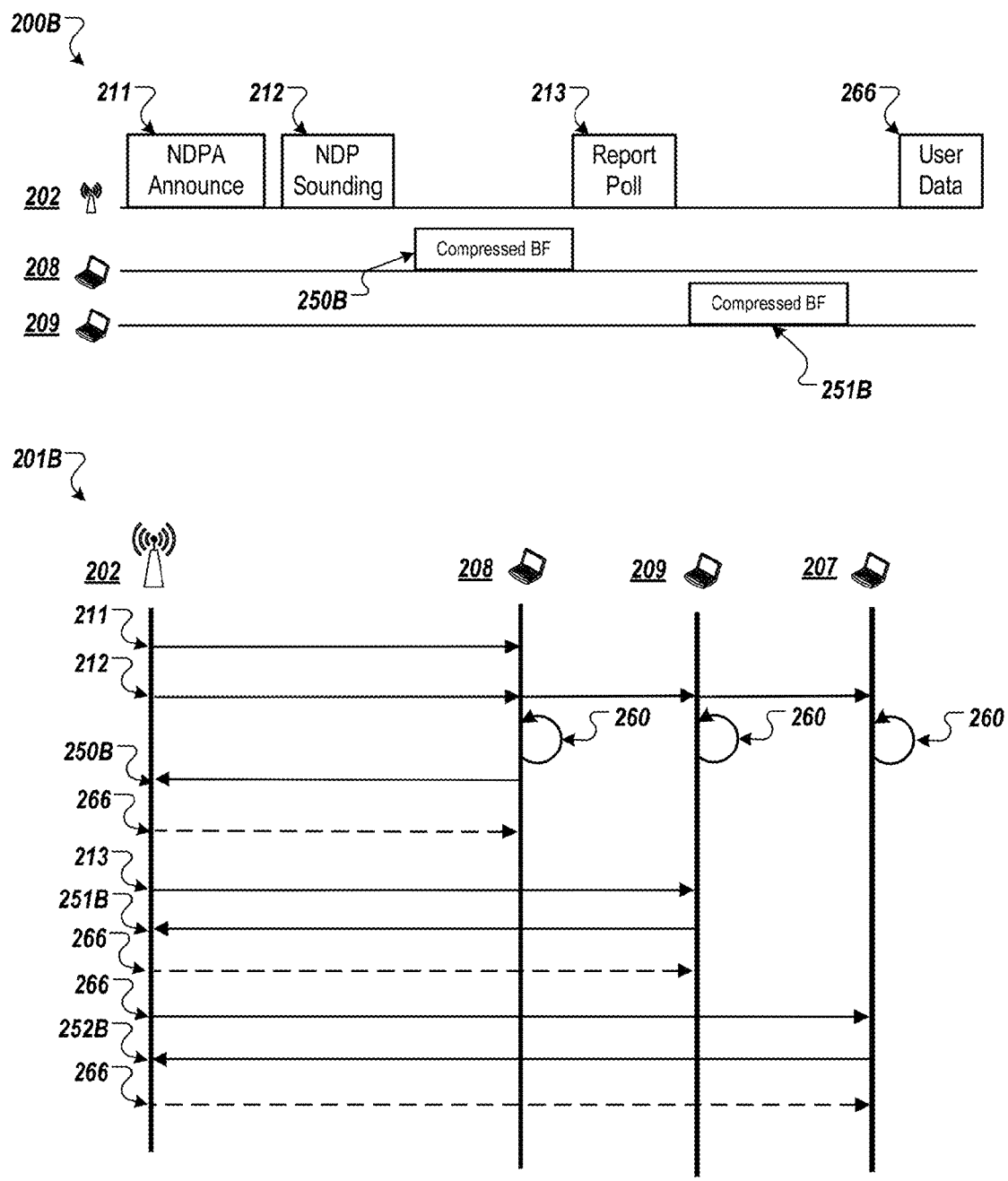

Conventional explicit sounding protocols have the transmitter 202 send sounding packages with announcement frames 211, null data packet (NDP) 212 frames, and response frames as illustrated in 200A, 200B, and 201C of FIGS. 2A and 2B. A traditional sounding package includes a pair of packets where the NDPA 211 packet precedes an NDP 212 packet and identifies the receiving station(s) 208 which are requested to share the channel analysis (e.g., CSI) performed by the beamformee (e.g., receiving station 208) with the beamformer (e.g., transmitter 202).

In the pair of packets, the NDPA 211 indicates which stations are to respond to the next NDP 212 sounding frame and describes the NDP frame dimensions. Following the NDPA 211, the transmitter 202 sends the sounding NDP 212 as a broadcast to be processed by the identified receiving station(s) 208. In response to receiving the NDP 212 broadcast, the identified beamformee performs a series of steps to measures the RF channel characteristics, process, and generate a steering matrix with channel measurements as parts of a detailed sounding feedback response packet 250. After the beamformee receiving station(s) 208 completes the series of steps, the station 208 responds to the NDPA 211 and NDP 212 with a detailed sounding feedback response packet 250.

FIG. 2B is a Prior Art sounding diagrams 200B and 201B of explicit sounding for sequential soundings and data communication. An explicit sounding of the link channels between the transmitter 202 and station 208 and the transmitter 202 and station 209 are shown in 200B and 201B. The sounding sequence includes the transmitter 202 sending the pair of sounding packets, NDPA 211 and NDP 212, and in response the targeted station 208 (after significant processing 260) sends back a compressed detailed sounding feedback response packet 250A. The transmitter then must send a report poll packet 213 at time to prompt the next station 209 from which detailed sounding feedback generation is requested.

Figure 2C:
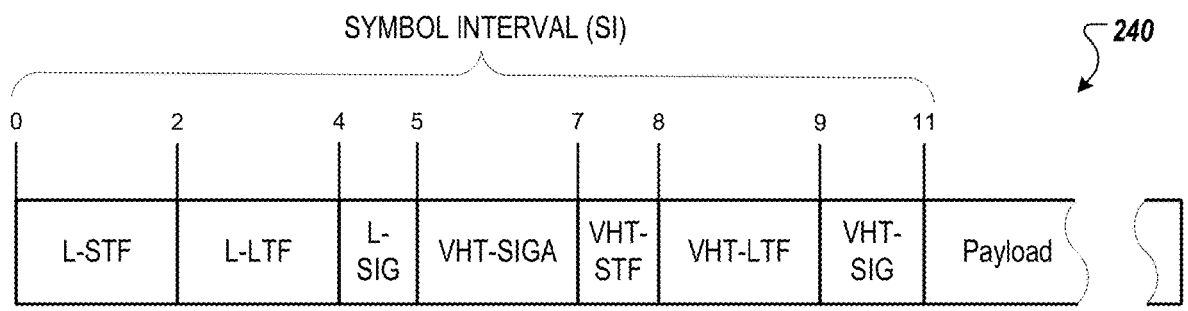

A header of the NDP packet 212 contains a ubiquitous preamble field that is used for channel estimation, which in the case of the IEEE 802.11ac standard is identified as a VHT-LTF field of FIG. 2C. The VHT-LTF field (e.g., a channel estimation or sounding field), contains a long training sequence used for MIMO channel estimation by the receiver station 208. Each recipient station 207, 208, 209 is then required to determine the corresponding beamsteering matrix required to adjust the phase and amplitude for subsequent MIMO transmissions by the transmitter 202 so as to update the received signal strength at the receiving station.

Each beamformee station 207, 208, 209, is required to perform significant processing of the NDP 260 to determine the detailed sounding feedback based on matrices by performing a singular value decomposition (SVD) on the H matrix for each sub-channel or tone that requires considerable processing resources (e.g., power, time, processor cycles, memory, etc.) to complete. The Signal-to-Noise Ratio (SNR) matrix is derived by scaling the SVD's sigma L matrix. Then each station waits for the transmitter to send another packet (e.g., a report poll 213) to prompt a response, and only then does the beamformee station send a single detailed sounding feedback in response to each report poll 213. That is, a first target station 208 only responds with a detailed beamforming feedback packet 250B containing CSI (e.g., a payload) when prompted. If the receiving station is IEEE 802.11n compliant the detailed feedback is in the form of the link channel matrix H. If the receiving station is IEEE 802.11ac compliant, the detailed feedback is in the form of the actual unitary beamsteering matrix V and the per tone diagonal matrix SNR. Any remaining stations targeted by the initial sounding, respond with the beamsteering matrix for their own link when asked to do so by the report poll 213. The next station 209 then responds with compressed detailed sounding feedback response packet 251B. Following the sounding, communications resume and downlink communication of user data is sent on the link(s) that have been sounded. Since each station 207, 208, 209 sends detailed sounding feedback reactively to each transmitter request, considerable bandwidth is consumed to maintain a large number of stations with frequent sounding sequences.

In response to each additional sounding packets 211 and 212, a beamformee 209 can send additional detailed beamforming feedback packets 251B, 252B, etc. In some approaches, the beamformee 209 can send additional detailed beamforming feedback packets 251B, 252B, in response to each prompt (e.g., report poll 213).

The user data packet(s) 266 (e.g., media access control (MAC) Service Data Unit (MSDU) or Protocol Data Unit (MPDU)) are sent using precoding based on an associated beamforming matrix. Transmitter 202 resumes sending user data packets 266 on the link(s) that have been sounded. The time and overhead required to send the detailed sounding feedback response packets 250A and 251B consumes substantial processing and transmission resources.

FIG. 2C a Prior Art packet diagram of a transmitter packet with a preamble field that is used for channel estimation. FIG. 2C includes a packet 240 and the corresponding symbol interval (SI) required to transmit each field. The header includes a legacy portion containing the L-STF, L-LTF and L-SIG fields and a very high throughput portion containing the VHT-SIGA, VHT-STF, VHT-LTF and VHT-SIGB fields. The payload portion contains no user data. The legacy (L), long (LTF) and short (STF) training and signal (SIG) fields are compatible with stations supporting only the IEEE 802.11n or earlier standards. The remaining signal and training fields are intended for very high throughput (e.g., IEEE 802.11ac compliant devices). The VHT-SIGA field contains information on the MCS and number of streams of the sounding. The VHT-STF field is used for automatic gain control (AGC). The VHT-LTF field (e.g., the channel estimation), includes a long training sequence used for MIMO channel estimation by the receiver.

Figure 2D:
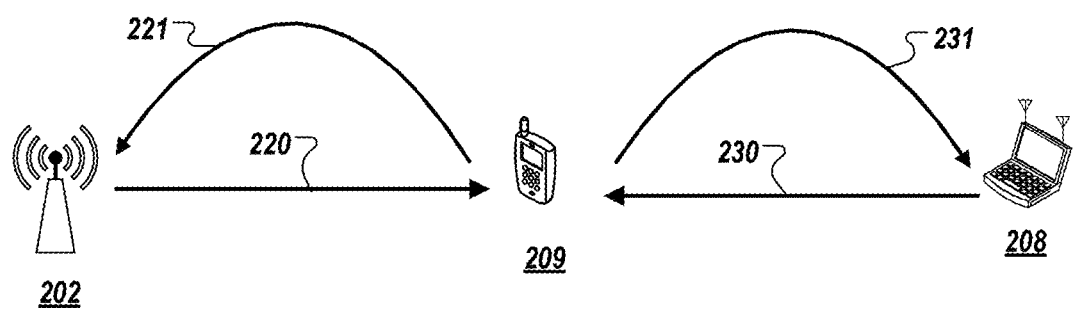

FIG. 2D is a diagram of sounding channels between an access point as transmitter 202 and one or more stations 208, 209. The access point and stations can be a transceiver including both a transmitter and a receiver that are combined and share common circuitry or a single housing. The access point and stations can also be a transmitter-receiver with separate circuitry between transmit and receive functions. A beamformer generally includes multiple antennas for a transmitter and a receiver while a beamformee may function with a single antenna or multiple antennas.

In an example where the access point transmitter 202 is the beamformer sounding beamformee station 209, the sounding channel can be described having both a forward channel 220 from the beamformer access point 202 to the beamformee station 209 and a reverse channel 221 from the beamformee station 209 to the beamformer access point 202. As shown in FIGS. 2A and 2B the beamformer access point 202 traditionally sends the pair of sounding packets with the NDPA announcement 211 and NDP sounding 212 via the forward channel 220 that is received by the beamformee station 209. The beamformee station 209 traditionally after processing the pair of sounding packets and then sends the detailed sounding feedback 250A, 250B, or 251B via the reverse channel 221.

Multiple stations 208, 209 can also sound each other for example as in a mesh network. In an example where the station 208 is the beamformer sounding beamformee station 209, the sounding channel can be described having both a forward channel 230 from the beamformer station 208 to the beamformee station 209 and a reverse channel 231 from the beamformee station 209 to the beamformer station 208. Thus, the beamformer station 208 sends the pair of sounding packets with the NDPA announcement 211 and NDP sounding 212 via the forward channel 230 that is received by the beamformee station 209. The beamformee station 209 traditionally, after processing the pair of sounding packets, then sends the detailed sounding feedback via the reverse channel 231.

Traditional explicit sounding requires the beamformer to send multiple packets to the beamformee, that then the beamformee must process each the multiple packets to generate detailed sounding feedback that are then returned when prompted. The multiple packets consume airtime of the forward channel 220 preventing the transmitter from using those communication resources for delivering actual user data to other stations. The detailed sounding feedback consumes significant processing cycles (e.g., 260), power of the beamformee, and bandwidth of the reverse channel 231. Regular sounding sequences with a beamformee stations that has limited resources can diminish the utility and usefulness of such station. Further, for networks with numerous stations, sounding with multiple packets and detailed sounding feedback wastes bandwidth and distracts the access point from effectively coordinating services for the growing demand of stations. Moreover, additional detailed sounding feedback packets are sent in response to receiving additional prompts from the beamformer.

Figure 3:
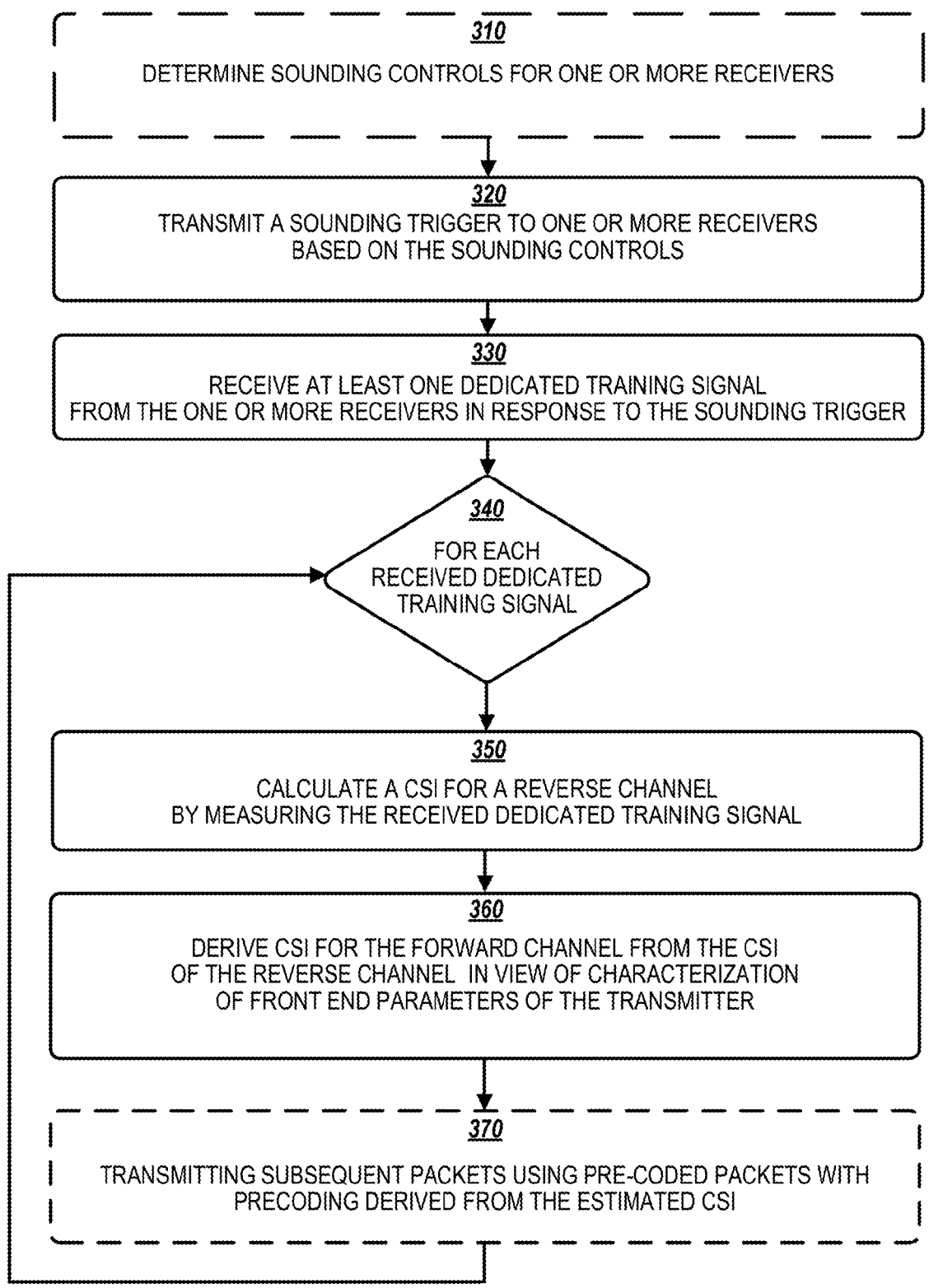
FIG. 3 illustrates a flow diagram of an example solicited sounding beamformer process in accordance with an example implementation.

FIG. 3 illustrates a flow diagram of an example solicited sounding beamformer process in accordance with an example implementation. The solicited sounding framework allows a beamformer to initiate the solicited sounding process in a coordinated scheme for several beamformee stations with different capabilities and configurable sounding characteristics. The solicited sounding framework further coordinates the beamformee stations to automatically update the beamformer with information to accurately precode user data without requiring the beamformer to send repeated requests or prompts for the updates.

The beamformer process can start at step 310 to determine sounding controls for one or more beamformee(s). In an example implementation, sounding controls can include sounding schedule instructions, training options, and station information as discussed in reference to FIGS. 4-8. Since the solicited sounding framework is initially initiated by the beamformer, it can coordinate multiple soundings sequences among several beamformees and reduces the processing overhead for sounding required by beamformees. The solicited sounding framework provides improved transmission overhead for sounding and requires minimal processing resources by the beamformees.

The sounding schedule and the training options can be based on communication parameters, for example, a beamformee's capabilities (e.g., beamforming, MIMO, etc.), traffic type (e.g., web browsing, video streaming, video conferencing, etc.), or positioning parameters (e.g., movement, dwell time, etc.). In an example implementation, the sounding schedule enables the beamformer to instruct the beamformee to send multiple dedicated training signals at scheduled sounding intervals in a coordinate manner and avoids sending multiple sounding trigger requests. The beamformee receives the sounding trigger with sounding instructions and provides an initial dedicated training signal response that does not require a payload or significant processing by the beamformee. The beamformee can store the instructions and execute the schedule to provide additional dedicated training signals without needing to receive additional sounding triggers or prompts. For example, the beamformer can determine sounding controls to include a sounding schedule with a short time interval for a receiver that previously received video conferencing traffic data.

At 320, the beamformer process transmits a sounding trigger to one or more beamformees based on the sounding controls. For example, the single sounding trigger can be a null data packet polling frame that is not preceded by an announcement frame. Unlike traditional explicit sounding techniques, solicited sounding enables the beamformer to trigger repeated information based on a single sounding trigger rather than a NDPA and NDP.

At 330, the beamformer process receives at least one dedicated training signal from the one or more beamformees in response to the sounding trigger. In solicited sounding the beamformee does not measure channel information from the received sounding trigger. The one or more dedicated training signals sent by the beamformee are triggered by the sounding trigger, but dedicated training signal does not require measurements associated with the transmission of the sounding trigger. For example, the dedicated training signal can be a null data packet without a payload of sounding data.

At 340, for each received dedicated training signal, the beamformer process performs steps 350 and 360 to estimate a forward channel state information. At step 350, the beamformer process calculates a CSI for a reverse channel by measuring the received dedicated training signal. At 360, the beamformer process derives a CSI for the forward channel, from the CSI of the reverse channel in view of characterization of front end parameters of the transmitter. In an example implementation, the beamformer process can use the estimated forward CSI at 370 to transmit subsequent packets using precoded packets with precoding derived from the estimated CSI. The beamformer process repeats, at least steps 350 and 360 for each receive dedicated training signal. Accordingly, the solicited sounding framework requires less beamformee processing and less bandwidth than traditional sounding approaches.

Figure 4A:
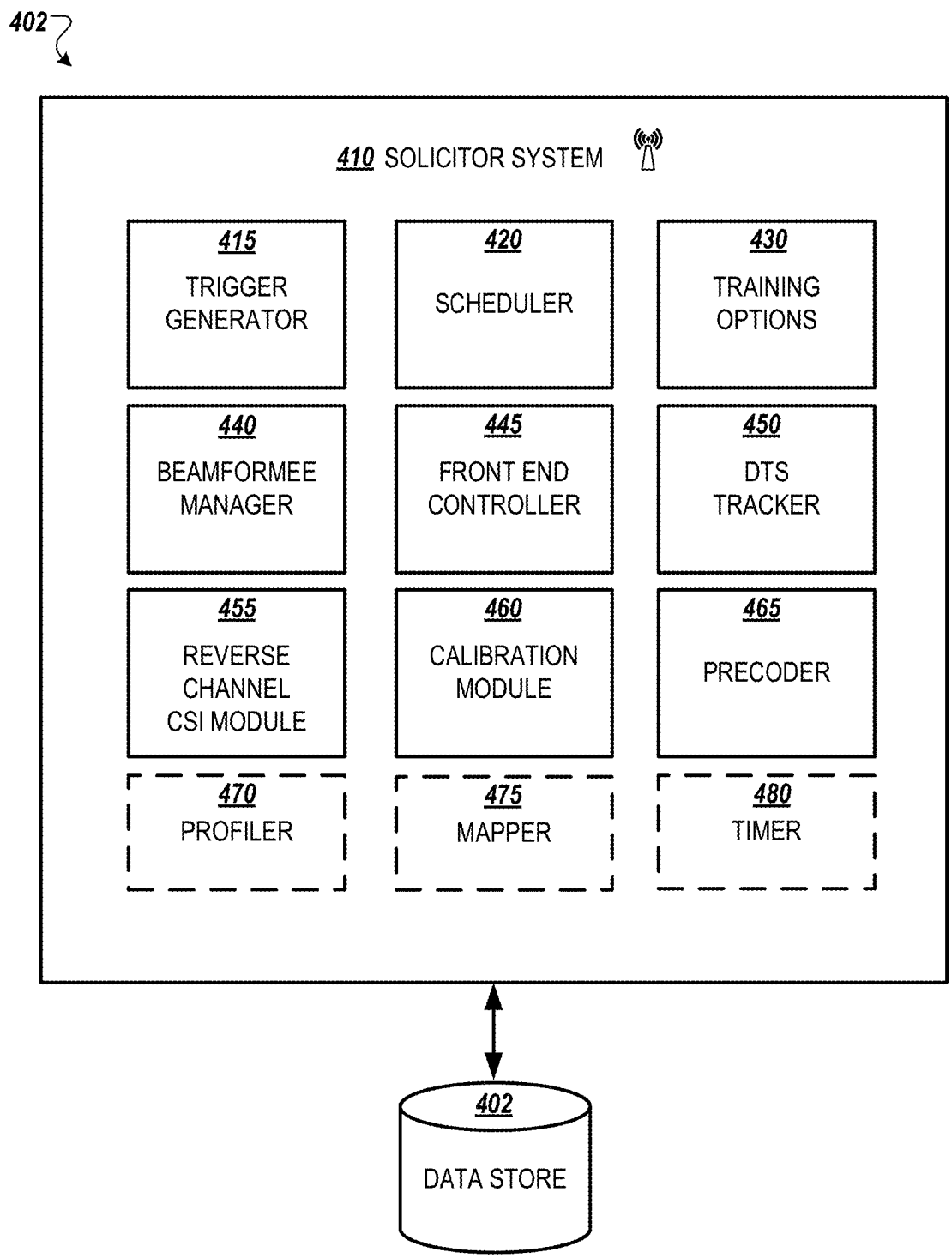
FIG. 4A illustrates a diagram of an example sounding solicitor system in accordance with an example implementation.

FIG. 4A illustrates a diagram of an example sounding solicitor system in accordance with an example implementation. The solicitor system 410 includes a trigger generator 415, a scheduler 420, a training options module 430, and a beamformee manager 440 for transmitting a sounding trigger to one or more beamformee. In an example implementation, the trigger generator 415 can create a sounding trigger that includes sounding controls such as sounding schedule instructions, training options, and station information for the one or more receivers. For example, training options for the beamformee to format the dedicated training signal can include repeated symbols, partial bandwidth, a number of bits, etc.

The trigger generator 415 uses the beamformee manager 440 to determine station information for a sounding trigger including a list of receivers to respond to the sounding trigger. The beamformee manager 440 can determine characteristics of stations that are to receive a sounding trigger from the transmitter. In some examples, the stations may be associated with the transmitter such that a successful handshake or authentication process has been attempted or successfully completed. The beamformee manager 440 can also deduce characteristics or assign identifiers to stations unassociated or authenticated with the transmitter. In some implementations, the beamformee manager 440 uses a data store 402 or a profiler module 470 to track or predict characteristics of stations. For example, the beamformee manager 440 can determine a station identifier (ID), capabilities of a station, a station type, a traffic/service type, location information, a predicted dwell time, etc. Further, the beamformee manager 440 can use captured MAC address information to determine or assign an identifier to a station. Using the beamformee manager 440, trigger generator 415 can include instructions in the sounding trigger that are targeted for different receivers.

In an example implementation, the trigger generator 415 can include different scheduling instructions in the sounding trigger that are targeted for different receivers. The beamformee manager 440 performs functions for coordinating and updating operations of the other modules of the solicitor system 410. For example, the beamformee manager 440 works with the scheduler 420 to generate a list of one or more receivers associated with a sounding trigger.

The scheduler 420 can generate scheduling instructions for individual targeted receivers or groups of receivers to provide dedicated training signals in a coordinated matter. For example, the scheduler 420 can generate scheduling instructions for different receivers to respond simultaneously in response a sounding trigger at different spatial streams. The solicitor system 410 can create various scheduling configurations as further discussed in reference to FIG. 5 herein.

In an example implementation, the trigger generator 415 can include scheduling instructions in the sounding trigger for groups of receivers and/or allow receivers in a group to determine a coordinated response time or interval. The beamformee manager 440 can identify groups of receivers and the scheduler 420 generates sounding instructions for the group in accordance with the beamformer process discussed in reference to FIGS. 3-5 herein.

In an example implementation, the trigger generator 415 can include training options in the sounding trigger for formatting the dedicated training signal by the one or more receivers. The beamformee manager 440 can operate with the training options module 430 to generate instructions for different receivers to respond to a sounding trigger with a dedicated training signal in a specific format or communication means (e.g., repeated symbol, spatial stream, partial bandwidth, a number of bits, etc.). The training options module 430 can also configure a set of training options in the sounding trigger based on characteristics of the transmitter, observed network behaviors or performance, environmental factors, feedback quality, etc.

The trigger generator 415 generates a sounding trigger for one or more receivers to solicit dedicated training signals with minimal overhead. In response to a single sounding trigger, the solicitor system 410 can receive multiple dedicated training signals from a single receiver and/or multiple different receivers.

The solicitor system 410 includes a front end controller 445, a dedicated training signals tracker module 450, a reverse channel CSI module 455, a calibration module 460, and a precoder 465 to process received dedicated training signals.

The front end controller 445 and the dedicated training signals tracker module 450 can operate with the beamformee manager 440 for handling multiple dedicated training signals received simultaneously. For example, the front end controller 445 can receive multiple dedicated training signals simultaneously at different spatial streams, the dedicated training signals tracker module 450 can queue the received dedicated training signals and associate them with a station profile or station information based on information from the beamformee manager 440.

The dedicated training signals tracker module 450 processes the received dedicated training signals with to measure channel information from each dedicated training signal, and the reverse channel CSI module 455 calculate CSI of the reverse channel from the measured dedicated training signal information. The calibration module 460 derives forward CSI for the forward channel from the reverse channel CSI utilizing the characteristics of the transmitter from the front end controller 445. Characteristics of the transmitter from the front end controller 445 can be based on specific hardware or software configurations of the transmitter such as manufacturing process variances, design parameters, transmit times or delays in RF hardware and band to antenna, delay difference between multiple chains of transmission, etc. The precoder 465 then uses precoding derived from the forward CSI for subsequent transmissions to the associated receiver via a forward channel.

Example implementations of the solicitor system 410 can also include a profiler 470, a mapper 475, and a timer module 480. The profiler 470 can track traffic with each station to generate historical information for predicting optimal configurations for sounding triggers. For example, based on a station's historical usage schedule or movement, the profiler 470 can indicate to the scheduler 420 an optimal time interval for scheduling repeated dedicated training signals in response to a single sounding trigger.

The mapper 475 can optimize sounding communications with stations of different capabilities. For example, the mapper 475 can coordinate with the front end controller 445 to receive dedicated training signals from multi-user MIMO (MU-MIMO) capable receivers, beamforming receivers, etc. The timer 480 support ranging operations with minimal overhead by leveraging the solicited sounding trigger and dedicated training signal responses. For example, the timer 480 can be used with training options module 430 to solicit a timestamp feedback with the dedicated training signal from a receiver to perform ranging operations to avoid or reduce additional triggers or request by the transmitter.

Figure 4B:
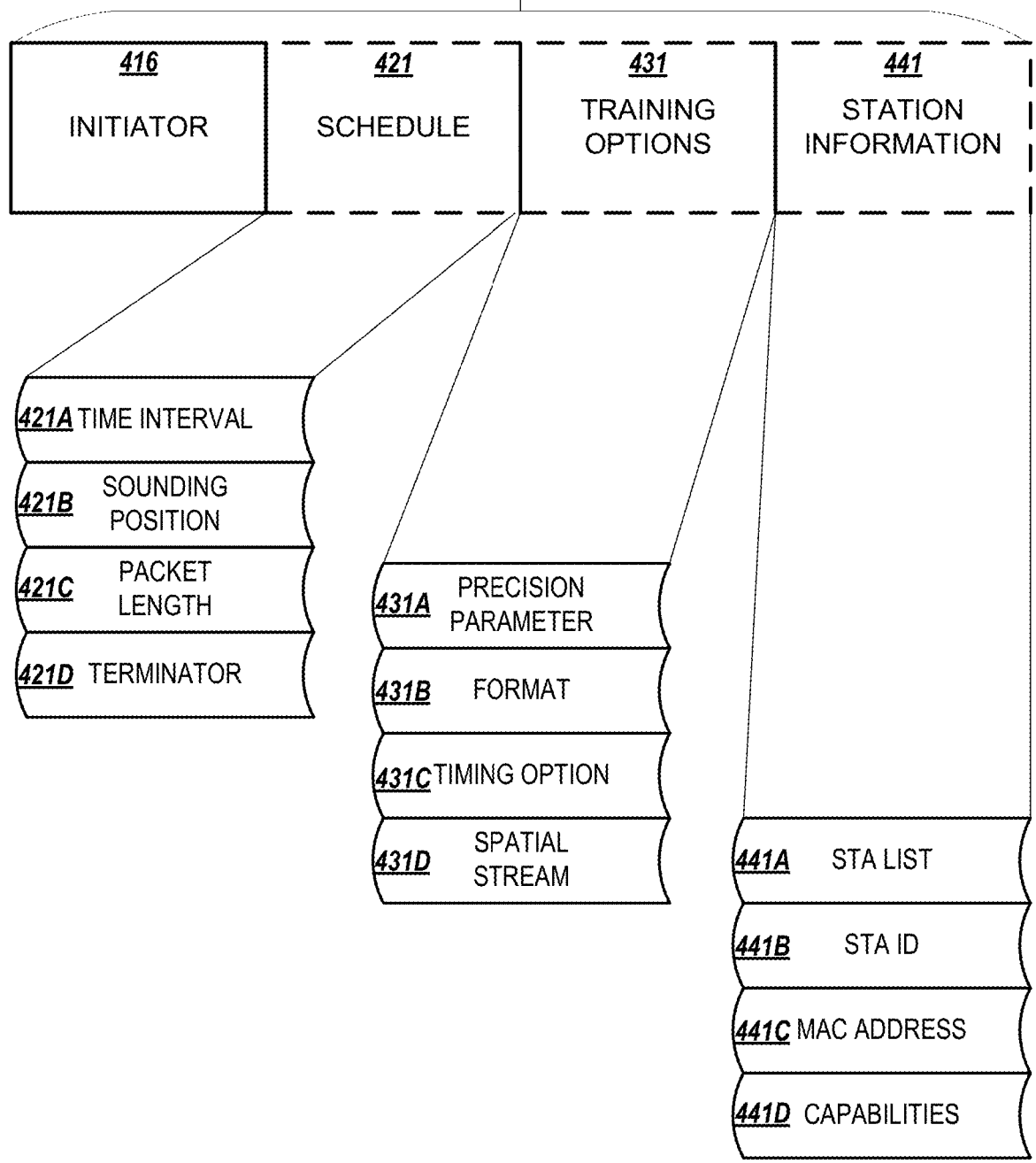
FIG. 4B illustrates a diagram of an example sounding trigger frame in accordance with an example implementation.

FIG. 4B illustrates a diagram of an example sounding trigger frame in accordance with an example implementation. The example sounding trigger 411 includes an initiator 416 that is a preamble to indicate for the receiver to respond with a dedicated training signal. The sounding trigger 411 is an individual frame that is transmitted and includes at least the preamble initiator 416 without any announcement packet. That is, the sounding trigger 411 is not part of a pair of packets or preceded by an announcement packet (e.g., a NDPA packet).

The sounding trigger 411 can include schedule information 421 created by scheduler 420 that, for example, allow for repeated responses to a single sounding trigger 411. Types of schedule information 421 can include a time interval 421A, a sounding position 421B, a packet length 421C, a terminator 421D, etc.

The time interval 421A of the schedule 421 indicates how often the beamformee is to send dedicated training signals after receiving a single sounding trigger 411. The solicitor system 410 can configure a time interval 421A to be static or dynamic based on time periods, network conditions, etc. for different beamformees receiving the single sounding trigger 411. For example, a static time interval 421A of the schedule 421 can instruct the beamformee to repeat sending dedicated training signals consistently according to a time frame (e.g., every 100 microseconds). A dynamic time interval 421A of the schedule 421 can instruct the beamformee to repeat sending dedicated training signals in bursts within a time frame or intermittently according to a timing factor, a condition, particular channel activity, etc.

The sounding position 421B can be used to indicate when the beamformee is to send a dedicated training signal according to a relative position or defined position. The sounding position 421B for the beamformee to send a dedicated training signal can be relative (e.g., an order, a location, a rank, a group, a time slot, etc.) to one or more other beamformees responding to the sounding trigger 411. For example, the sounding trigger 411 can be sent to a list of beamformees and the sounding position 421B indicates a sequence for each of the beamformees in the list to transmit a dedicated training signal. The beamformees can repeat sending dedicated training signals by restarting the sequence without receiving another sounding trigger 411. In another example, the sounding position 421B indicates coordinated time positions (e.g., based on a time scale, a reference time, etc.) for each of the beamformees to repeat sending dedicated training signals in groups or at different times without receiving another sounding trigger 411.

In some implementations, the sounding position 421B indicates for beamformee to repeat sending dedicated training signals by listening to a channel in view of the packet length 421C of the sounding trigger 411. For example, the beamformee can monitor the channel for a preamble from another beamformee or count the number transmissions heard from other beamformees, determine a preceding beamformee based on the sounding position 421B, and calculate a time to transmit after the preceding beamformee in view of the packet length 421C.

The schedule 421 can include a terminator 421D to indicate or signal for one or more of the beamformees to stop or suspend sending additional dedicated training signals. In some implementations, the terminator 421D is sent with a first sounding trigger 411 to indicate when one or more of the beamformees are to stop or suspend sending dedicated training signals. For example, the terminator 421D can indicate a number of dedicated training signals to send without receiving another sounding trigger. The terminator 421D can also indicate to suspend sending dedicated training signals after a period of time or condition (e.g., a schedule expiration). Other implementations can include a second sounding trigger 411 with the terminator 421D that signals to stop or suspend sending dedicated training signals. The sounding trigger 411 can include a terminator 421D for each targeted beamformee, a subgroup of targeted beamformees, or all responding beamformees. In another example, the sounding trigger 411 can include training options 431 configured by training options module 430 to, for example, instruct receivers how to format or customize the dedicated training signal. Types of training options 431 can include precision parameters 431A, format 431B, a timing option 431C, spatial stream 431D, etc.

For example, precision parameters 431A can indicate how often to repeat symbols in the VHT-LTF for the purposes of averaging at the receiver. In an example, a timing option 431C can indicate a measured time of arrival of an incoming packet and measured time of departure of an outgoing packet. Training options 431 can include spatial stream 431D configurations for use with MU-MIMO capable receivers. Other examples training options 431 can include configurable format 431B elements as understood in the art.

The sounding trigger 411 can also include station information 441 coordinated by the beamformee manager 440 to enable, for example, multiple receivers to respond to a single sounding trigger 411. Types of station information 441 can include a station list 441A, a station identifier 441B, a MAC address 441C, a station capability 441D, etc.

Example implementations of solicited sounding as described herein can use the sounding trigger 411 containing the initiator 416 and additionally including none, some, or all of the schedule information 421, training options 431, and/or station information 441 discussed herein.

Figure 5A:
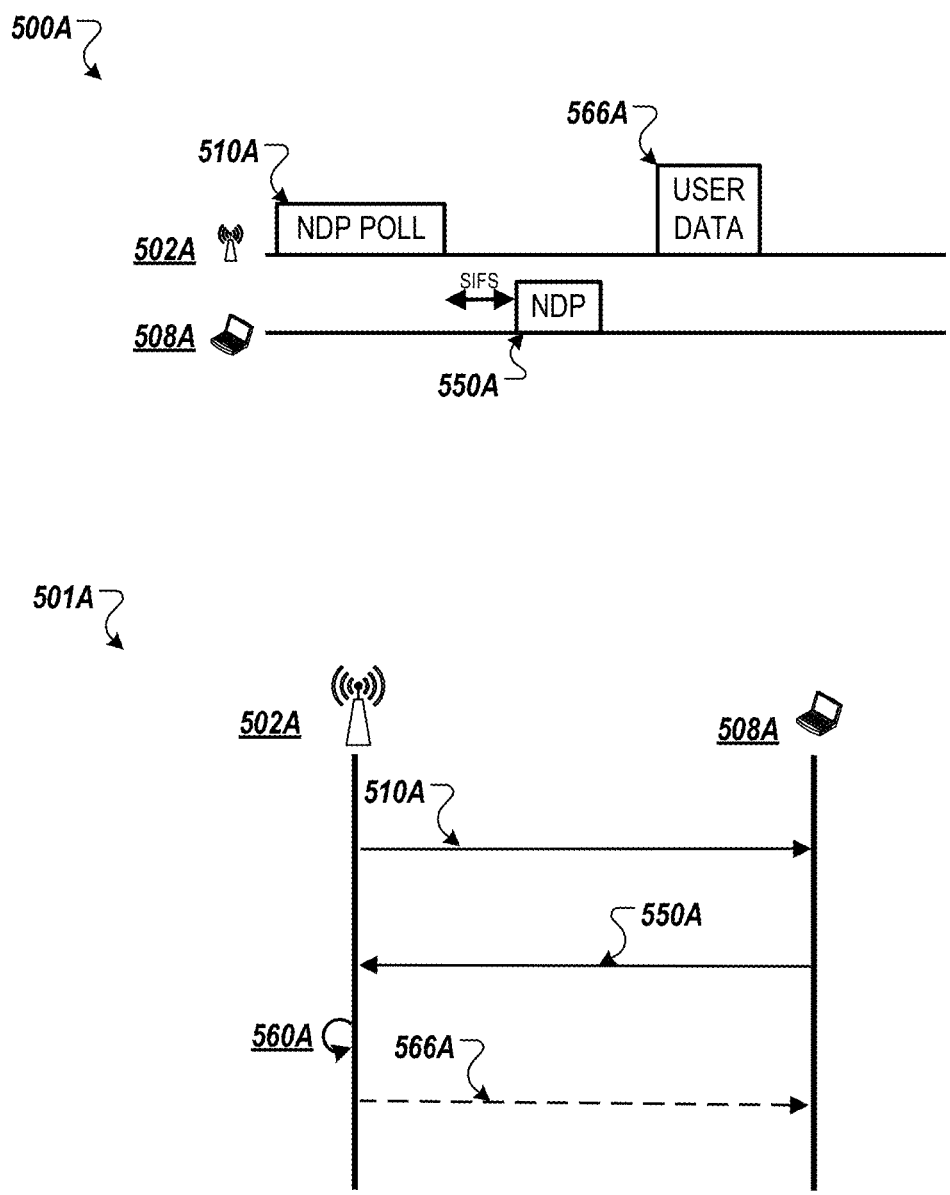

FIGS. 5A-5G illustrate example sequences of solicited sounding in accordance with various example implementations. FIG. 5A illustrates an example sequences 500A and 501A of solicited sounding for a targeted station 508A. The solicited sounding process may be initiated by an access point 502A to sound a channel for communicating with a station 508A. In the example implementation illustrate in 500A and 501A of FIG. 5A, the access point 502A initiates the solicited sounding by sending an NDP Poll 510A as a sounding trigger that identifies the access point 502A and the target recipient station(s) 508A.

In response receiving the NDP Poll 510A, the station 508A sends an NDP 550A to the access point 502A. The NDP 550A is sent within a first interval (e.g., a Short Interframe Space (SIFS) or fraction of a SIFS) of the NDP Poll 510A. The access point 502A reserves the channel during a predetermined response period for receiving the dedicated training signal. This NDP 550A response packet is an example dedicated training signal with no user data that can be processed to estimate reverse channel information in the reverse direction from the station 508A to the access point 502A. The access point 502A uses the reverse channel information derived based on the NDP 550A to estimate the forward CSI to determine the corresponding link matrix(s) used to adjust the forward channel precoding for subsequent MIMO transmissions (e.g., user data 566A) by the access point 502A to the target station 508A.

FIG. 5B illustrates an example sequences 500B, 501B and 503B of solicited sounding burst in accordance with various example implementations. In an example implementation, a solicited sounding can include separate sounding triggers NDP Poll 510B to solicit one or more dedicated training signals (e.g., NDP 550B, 551B, 552B) from a single station 508B as illustrated in sequences 500B and 501B of FIG. 5B. The beamformer can send additional NDP Poll 511B to update (e.g., add, change, modify, cancel, etc.) instructions for single station 508B indicated by the previous NDP Poll 510B.

The solicited sounding framework enables improved quality of data communications by instructing the beamformee to send multiple dedicated training signals over time without additional prompts so that the beamformer can use the multiple dedicated training signals to re-sound the link with updated CSI. Further, the beamformer can send another sounding trigger to maintain coordinated sounding sequences with the one or more beamformees to efficiently maintain communication links within the network. For example, the beamformer can send another sounding trigger to account for changes in transmission quality, network resources, performance of one or more of the beamformees. In an example, as data communications degrade the beamformer can send another sounding trigger to update a sounding interval or training signal format indicated by a previous sounding trigger.

In another example implementation, a solicited sounding burst can include separate sounding triggers NDP Poll 510B and 511B to solicit one or more dedicated training signals (e.g., NDP 550B, 551B, 552B) from different stations 508B, 509B as illustrated in sequences 500B and 503B of FIG. 5B. The sounding triggers NDP Poll 510B and 511B can be sent to one or more stations 508B, 509B in accordance with various example implementations. That is, NDP Poll 510B can be directed to a first station 508B and NDP Poll 511B can be directed to a second station 509B. In another example, NDP Poll 510B and NDP Poll 511B can be directed to both the first station 508B and the second station 509B. Further, NDP Poll 510B can be directed to a first station 508B and NDP Poll 511B can be directed to both the first station 508B and the second station 509B. Alternatively, NDP Poll 510B can be directed to both the first station 508B and the second station 509B and NDP Poll 511B can be sent to update sounding instructions for one of the stations (e.g., the first station 508B).

The solicited sounding process is initiated by the access point 502A to sound multiple different stations 508B, 509B with multiple sounding triggers NDP Poll 510B and 511B. In the example implementation illustrate by FIG. 5B, the access point 502B initiates the solicited sounding by sending a first NDP Poll 510B to a first station 508B and receives a first NDP 550B within a first interval for sounding of the first NDP Poll 510B. After receiving the first dedicated training signal from the first station 508B, the access point 502B can initiate another solicited sounding by sending a second NDP Poll 511B and receives a second NDP 551B from a second station 509B.

The first NDP Poll 510B and/or the second NDP Poll 511B can include a schedule for the respective station 508B and/or station 509B to send additional NDPs 552B responses without receiving additional NDP Polls. The access point 502B uses each received NDP 550B, NDP 551B, and NDP 552B to estimate forward CSI derived based on each NDP for sounding the associated station 508B or 509B. In another example implementation illustrate by FIG. 5B, a first NDP Poll 510B can be used to solicit one or more dedicated training signals from a targeted station 508B as an NDP 550B response. Based on the received NDP 550B, the access point 502B derives the forward CSI for the forward channel from the reverse channel CSI in view of characteristics of a radio frequency front end of the transmitter and subsequent packets are precoded with precoding derived from the forward CSI for transmission.

The NDP Poll 510B can include instructions for the targeted station 508B to send additional NDPs without an additional NDP Poll. The access point 502B can also send another NDP Poll 511B to the target station 508B to change (e.g., modify, replace, cancel, etc.) instructions indicated by a previous sounding trigger (e.g., first NDP Poll 510B). The second NDP Poll 511B can be used to update a parameter for soliciting one or more dedicated training signals indicated by a pervious NDP Poll 510B sent to one or more recipients.

Figure 5C:
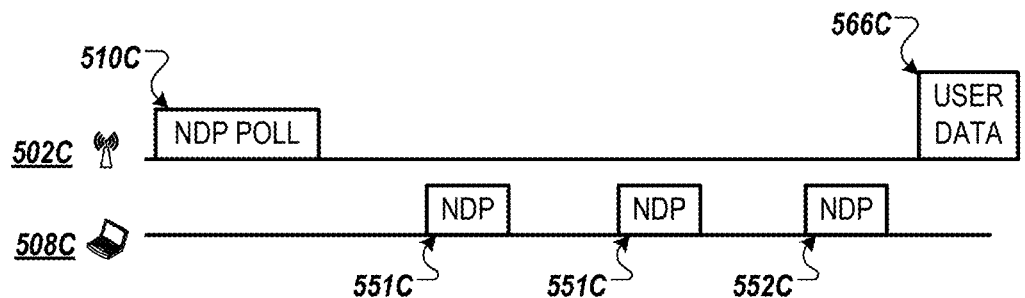

FIG. 5C illustrates an example sequence of solicited sounding for a series of dedicated training signal responses. In an example implementation, an NDP Poll 510C can include instructions for a targeted station 508C to send a series of NDPs 550C, 551C, 552C, without sending an additional NDP Poll.

In an example implementation illustrate by FIG. 5C, a first NDP 550C can be sent by the station 508C to the access point 502C as an initial response to the NDP Poll 510C from the access point 502C. The targeted station 508C can send additional dedicated training signals NDP 551C and NDP 552C based on instructions included in NDP Poll 510C. To receive the additional NDP 551C and NDP 552C, the access point 502C can maintain a timer to anticipate when to expect the additional dedicated training signals and reserve a channel.

For example, the NDP Poll 510C can include instructions that coordinate with the targeted station 508C when to expect a series of NDPs 550C, 551C, 552C at fixed or variable intervals, time window, based on satisfying a threshold condition, an external measuring resource, prediction, etc. Thus the access point 502C can receive the series of NDPs 550C, 551C, 552C based on a single NDP Poll 510C.

Figure 5D:
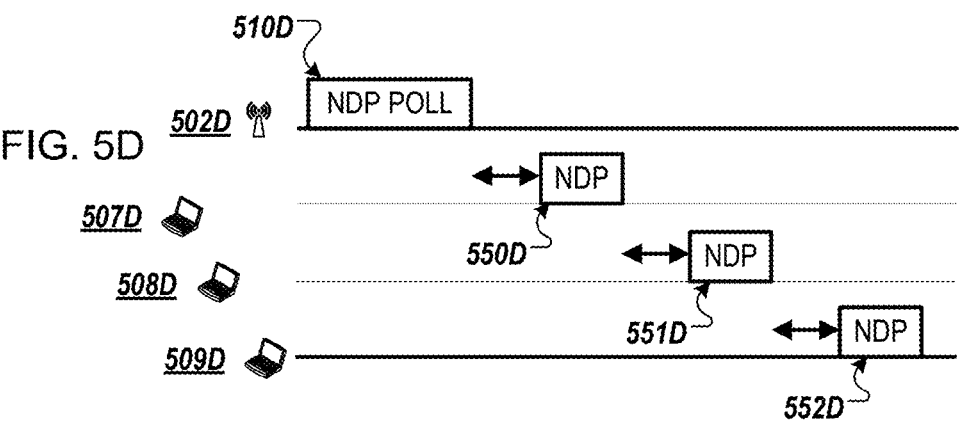

FIG. 5D illustrates an example sequences of solicited sounding for a series of dedicated training signal responses from one or more stations 550D, 551D, 552D. In an example implementation, an NDP Poll 510D can include instructions indicating a schedule for multiple different stations 507D, 508D, 509D to send multiple NDPs 550D, 551D, 552D without an additional NDP Poll. In the example implementation illustrate by FIG. 5D, the NDP Poll 510D can include a schedule to indicate a response interval, sounding position, etc. for each when of the stations 507D, 508D, 509D are to send NDPs 550D, 551D, 552D.

The NDP Poll 510D is a sounding trigger that identifies the access point 502 and the target recipient station(s) 508 for the solicited sounding. Where an NDP Poll 510D is sent to more than one station, the stations 507D, 508D, 509D can use the order in which the recipient stations are listed in the instructions from the sounding trigger 510D to control an order or position for sending NDPs 550D, 551D, 552D. For example, the NDP Poll 510D can include a list with the order or sounding position of each of the stations 507D, 508D, 509D. The stations 507D, 508D, 509D can repeat sending NDPs 550D, 551D, 552D to the access point 502D according to the order or schedule until the schedule expires, a termination command is sent, a new NDP Poll is received, or the station 507D goes offline.

For example, scheduling instructions indicated by the NDP Poll 510D can assign stations 507D to send a first NDP 550D within a SIFS relative to the NDP Poll 510D, stations 508D to send another NDP 551D within a SIFS relative to the first NDP 550D, and stations 509D to send a third NDP 552D within a SIFS relative to the second NDP 551D.

In another example implementation, the NDP Poll 510D can initiate multiple different stations 507D, 508D, 509D to send a multiple NDPs 550D, 551D, 552D without an additional NDP Poll where the different stations 507D, 508D, 509D determine when to send the each of the NDPs 550D, 551D, 552D. For example, NDP Poll 510D can be received by multiple different stations 507D, 508D, 509D and each station can monitor a network channel for a preamble of other dedicated training signals from other receivers responding to the sounding trigger.

In this example, station 507D can start responding to NDP Poll 510D with NDP 550D, and station 508D can monitor the network channel and listen for a preamble of NDP 550D. The station 508D can calculate a packet length of the NDP 550D from listening to the preamble of NDP 550D. Based on the packet length, station 508D can determine when the channel will be available next for transmitting the access point 502D and then transmit an NDPs 551D when the channel is available.

In another example, station 507D and station 508D can contend for the medium prior to sending the NDPs. For example, station 507D and station 508D each can attempt to transmit, detect the channel is busy, and wait an amount of time (e.g., a contention window) before attempting to transmit again. In response to a first station 508D detecting the channel is available, NDP 551D is transmitted while station 507D waits another amount of time before attempting to transmit. Then after another amount of time, if the second station 507D detects the channel is available, NDP 550D is transmitted.

As described above, the NDPs 550D, 551D, 552D response packets are dedicated training signals with no user data that can be processed to estimate reverse channel information in the direction from each of the stations 507D, 508D, 509D, to the access point 502D. Then for each received NDPs 550D, 551D, 552D. the access point 502D estimates forward CSI derived based on the respective NDP to determine the corresponding link matrix(s) required to adjust the forward channel precoding for subsequent MIMO transmissions (e.g., user data 566) by the access point 502 to the associated target station.

Figure 5E:
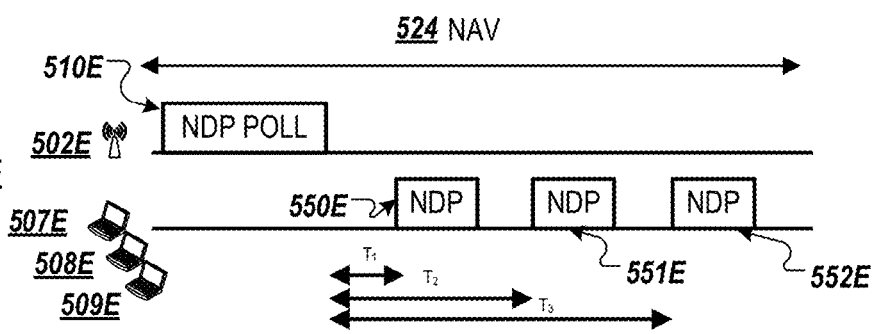

FIG. 5E illustrates an example sequences of solicited sounding with a variable response schedule. The access point 502E can send an NDP Poll 510 to multiple different stations 507E, 508E, 509E, or groups of stations and received multiple NDPs (E.g., 550E, 551E, 552E) within a response window (e.g., network allocation vector (NAV) 524).

The access point 502E can establish the response window coordinate with stations responding to the sounding trigger to transmit and block non-responding stations from attempting to transmit on the channel. For example, the NAV 524 provides a virtual carrier-sensing mechanism to control network access by signaling stations on the network that the channel is unavailable or busy for a specified contention period. The stations that are not responding to NDP Poll 510E listen on the wireless medium and use a duration field and set their NAV to indicate on how long it must defer from accessing the medium.

The responding stations 507E, 508E, 509E can respond at different times (e.g., $T_1$, $T_2$, $T_3$, etc.) based on schedule instruction of the NDP Poll 510E. The solicited sounding framework supports a variety of scheduling schemes as described herein. For example, the NDP Poll 510E can indicate a sounding position relative to other receiver stations, and each station 507E, 508E, 509E can determine one or more response times based on the sounding position to transmit the one or more dedicated training signals at the calculated response times. In another example, stations 507E, 508E, 509E can coordinate sending multiple NDPs 550E, 551E, 552E sequentially by determining a response time based on a packet length of the NDP. Each station 507E, 508E, 509E can monitor the channel listen for a preamble of an NDP from another one of the stations to determine the packet length of the NDPs. From the determined the packet length of the NDPs, a second station 508E can calculate a response time $T_2$ from a reference time such as the last detected NDP preamble.

Figure 5F:
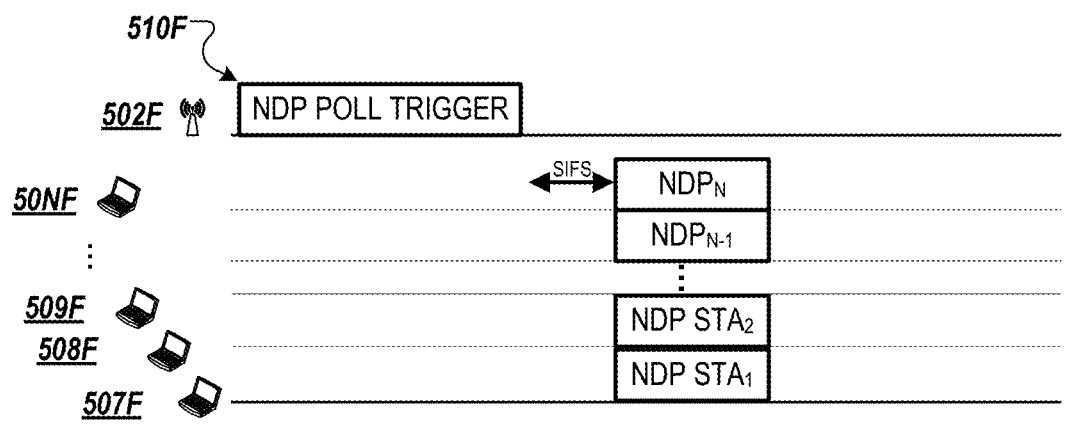

FIG. 5F illustrates example sequences of solicited sounding with Uplink MU-MIMO communication. An access point with front end RF capable parameters for uplink MU-MIMO communication breaks-up available bandwidth into separate individual streams (i.e., spatial streams) that share the medium equally. With uplink MU-MIMO, an access point can receive distinct data from two or more stations concurrently over a same set of OFDM tones. An MU-MIMO access point is characterized by front end parameters (e.g., a number of transmit and receive chains, antenna, etc.) of the transmitter where the capacity to transmit and receive up to n×m communications streams per link of an antenna array.

In an example implementation, an NDP Poll Trigger 510F can solicit multiple MU-MIMO capable stations 506F, 507F, 508F, 509F to simultaneously send NDPs (e.g., NDP $STA_1$, NDP $STA_2$, ..., $NDP_{N-1}$, $NDP_N$) on separate spatial streams to a MU-MIMO capable access point 502F. The NDP Poll Trigger 510F can indicate or assign a targeted spatial stream for each station 506F, 507F, 508F, 509F to transmit a respective NDPs (e.g., NDP $STA_1$, NDP $STA_2$, ..., $NDP_{N-1}$, $NDP_N$) so each of responses is received by the access point 502F at the same time. The NDP Poll Trigger 510F can also be used by the stations 506F, 507F, 508F, 509F as a time reference point to coordinate the simultaneous transmission of the multiple NDPs (e.g., NDP $STA_1$, NDP $STA_2$, ..., $NDP_{N-1}$, $NDP_N$) on different spatial streams so that the MU-MIMO capable access point 502F can properly process the NDPs (e.g., NDP $STA_1$, NDP $STA_2$, ..., $NDP_{N-1}$, $NDP_N$) to estimate forward channel information.

In an example implementation illustrate by FIG. 5F, a first NDP $STA_1$ can be sent by the station 506F on a first spatial stream, a second NDP $STA_2$ can be sent by the station 507F on a second spatial stream, ..., $NDP_{N-1}$ can be sent by a station 508F on spatial stream N–1, $NDP_N$ can be sent by a station 509F on spatial stream N, and up to the number of available spatial streams indicated by the access point 502F.

Figure 5G:
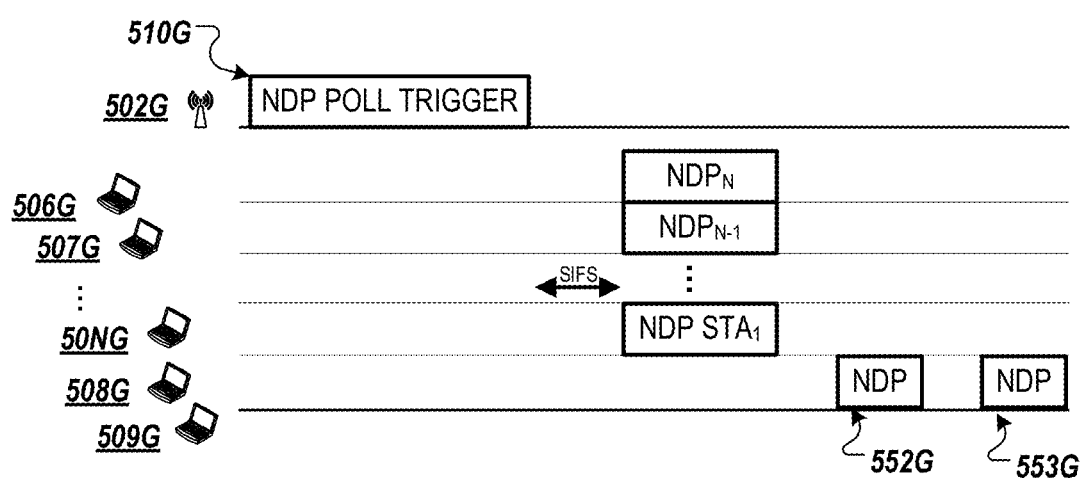

FIG. 5G illustrates an example sequences of solicited sounding with different types of stations. In an example implementation illustrated by FIG. 5G, an NDP Poll 510G can solicit multiple different stations that grouped to send dedicated training signals. In one example, different stations (e.g., 506G-SONG) can be grouped based on their capabilities and scheduled to send NDPs at different times.

For example, the NDP Poll 510G can instruct a first group of MU-MIMO capable stations 506G to SONG to simultaneously send NDPs (e.g., NDP $STA_1$, NDP $STA_2$, ..., $NDP_{N-1}$, $NDP_N$) on separate spatial streams within a first response interval, and further instruct a second group of beamforming capable stations 508G and 509G to sequentially send NDPs 552G, 553G after the response interval. Example implementations can include combinations of different scheduling and training options as discussed herein.

Figure 6:
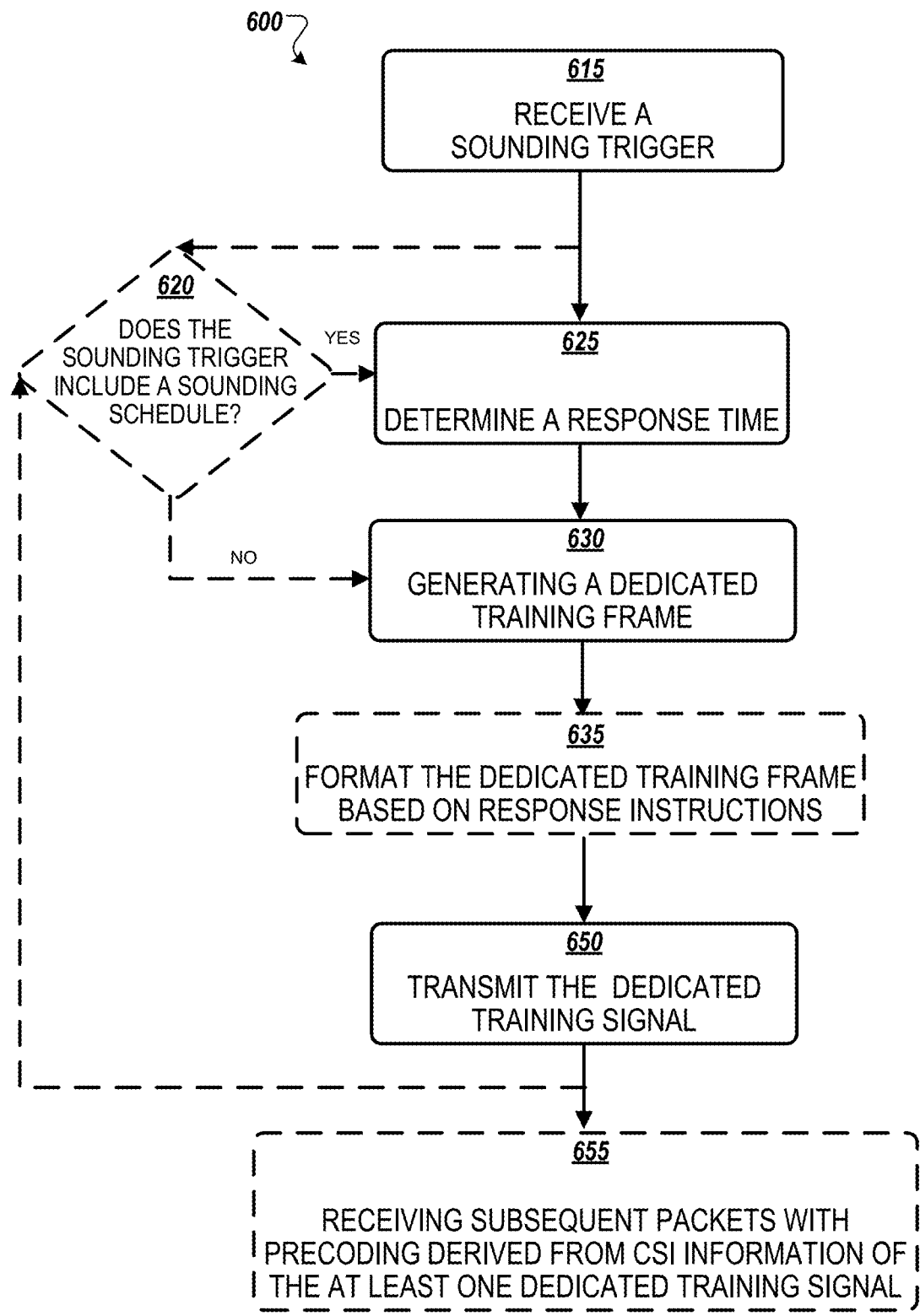
FIG. 6 illustrates a flow diagram of an example solicited sounding beamformee process in accordance with an example implementation.

FIG. 6 illustrates a flow diagram of an example solicited sounding beamformee process in accordance with an example implementation. Solicited sounding process 600 for the beamformee can include receiving a sounding trigger at 615 from a wireless transmitter and transmitting at least one dedicated training signal in response to the sounding trigger 650. In an example, the beamformee receives subsequent packets with precoding derived from CSI information of the at least one dedicated training signal at 655.

In an example implementation, at 625 the beamformee determines a response time for transmitting. The beamformee can process a single sounding trigger to provide multiple dedicated training signals that are used to determine precoding for subsequent packets sent via the forward channel from the transmitter. The beamformee can determine the response time for transmitting without a sounding schedule by, for example, immediately responding, using contention based transmission, recalling a schedule from memory, monitoring the channel for information from other stations, etc.

The beamformee can also process the sounding trigger to set a scheduler for providing additional dedicated training signals and configure the dedicated training signals at 620. In an example implementation, the wireless receiver receives the sounding trigger at 615 that indicates a sounding schedule at 625 and training options for a format of the dedicated training signal. The beamformee stores the sounding schedule and calculates a response time for each of the one or more dedicated training signals based on the sounding schedule.

In an example implementation, the at least one dedicated training signal from the one or more beamformees includes multiple dedicated training signals from an associated beamformee in response to the sounding trigger. The sounding trigger indicates a sounding schedule for additional dedicated training signals from the associated beamformee, and the multiple dedicated training signals from the associated beamformee are received at timed intervals based on the sounding schedule The beamformee can also format the dedicated training signals based on the training options from the sounding trigger at 635. In an example, the beamformee can determine a time to send a dedicated training signal by monitoring network traffic for a preamble of other dedicated training signals from other receivers responding to the sounding trigger. Then the beamformee can derive a packet length of the dedicated training signal based on the other dedicated training signals and determine a response time based on the packet length.

In another example, where the sounding trigger can indicate a sounding position relative to other receivers, the beamformee calculates one or more response times based on the sounding position and transmits the one or more dedicated training signals at the calculated response times.

Figure 7A:
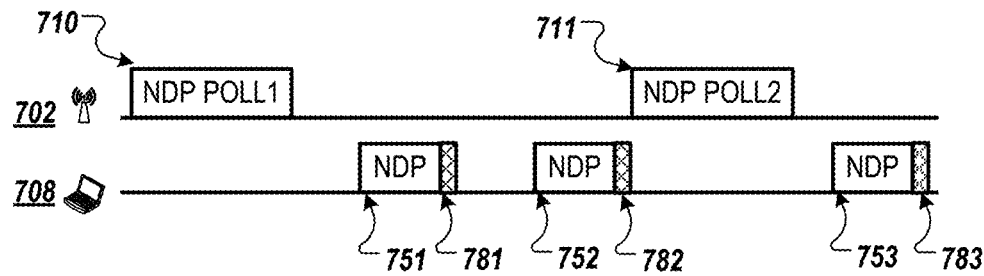
FIGS. 7A-B illustrate an example of solicited sounding with timing feedback in accordance with example implementations.
Figure 7B:
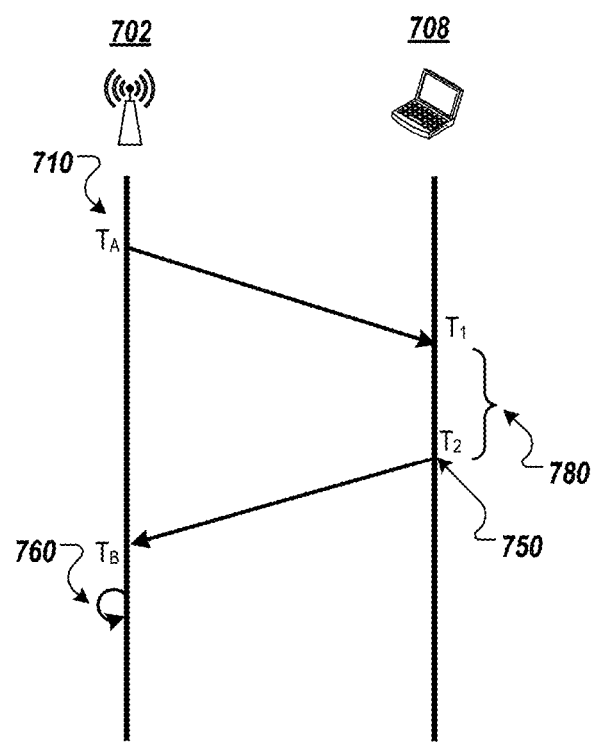

FIGS. 7A-B illustrate an example of solicited sounding with timing feedback in accordance with example implementations. In other example implementations, the beamformee can adapt the solicited sounding framework for streamlining or supporting other networking applications (e.g., motion tracking, building automation, etc.) in addition to sounding. In an example, the beamformee can determine timing feedback based on measured time of arrive of the incoming packet and measured time of departure of the outgoing packet. Then the beamformee can transmit a timestamp or other timing information with at least one of the dedicated training signals. Including additional timing feedback with the dedicated training signal can efficiently synchronize timing between stations, ranging functions, etc. with minimal increase to transmission overhead between the beamformee and beamformer.

FIG. 7A illustrates an example sequences of solicited sounding with timing feedback. In other example implementations, the stations 707, 708, 709 can adapt the solicited sounding framework for streamlining or supporting other networking applications (e.g., motion tracking, building automation, etc.) in addition to sounding. In an example, the stations 707, 708, 709 can determine additional feedback parameters 781, 782, 783 that is transmitted to the access point 702E with the NDPs 751, 752, 753. For example, stations 751, 752, 753 can determine timing feedback parameters 781, 782, 783 that are transmitted with the NDPs 751, 752, 753 that can be used by the access point 702 for other network applications or coordination such as efficiently synchronize timing between stations, ranging functions, etc.

The NDPs 751, 752, 753 do not include a payload or user data for solicited sounding purposes. However, additional feedback timing feedback parameters 781, 782, 783 can optionally be transmitted with NDPs 751, 752, 753 to streamline or support other networking applications (e.g., motion tracking, building automation, etc.) in addition to sounding. By transmitting additional feedback parameters 781, 782, 783 with NDPs 751, 752, 753, the access point 702 can initiate multiple functions with a single trigger. For example, the access point 702 can extract or determine timing information from data (e.g., additional feedback parameters 781, 782, 783) appended to the NDPs 751, 752, 753. The additional feedback parameters 781, 782, 783 are not required for and not used by the beamformer to complete the solicited sounding process. However, by operatively coupling the additional feedback parameters 781, 782, 783 appended to the NDPs 751, 752, 753, the number of overhead transmissions between a beamformer and beamformee can be further reduced.

FIG. 7B illustrates an example time sequences of solicited sounding with timing feedback. In an example implementation, the station 708 determining timing feedback 780 based on measured time of arrival of an incoming packet $T_1$ and measured time of departure $T_2$ of an outgoing packet. In an example, the timing feedback 780 can be the difference in the times, one or more timestamps or other calculations. The station 708 can optionally include the timing feedback 780 as additional information 781 during a transmission of an NDP 751 when responding to an NDP Poll 710. By transmitting the timing feedback 780 as additional information 781 during a transmission of an NDP 751, the solicited sounding framework can be leveraged to eliminate or avoid a separate additional transmissions of timing feedback 780 to efficiently provide additional functionality. The beamformee can enable the access point 702 to process other applications 760 in addition to the solicited sounding from the single transmission from the station 708 thus increasing availability of the channel.

Figure 8A:
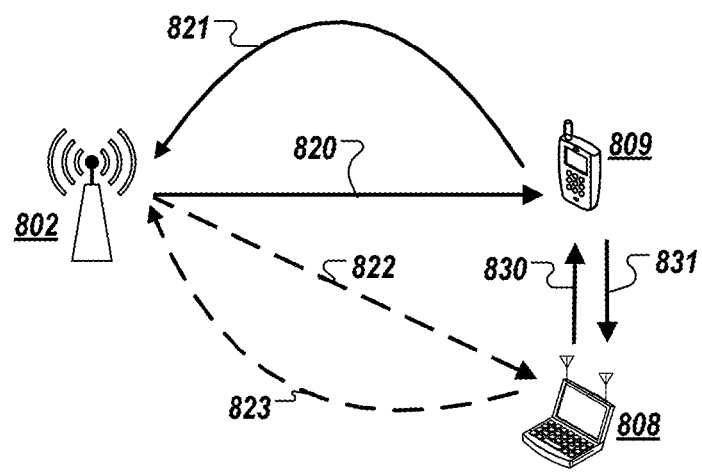
FIGS. 8A-C illustrate an example of sounding solicited by another beamformer in accordance with an example implementation.
Figure 8B:
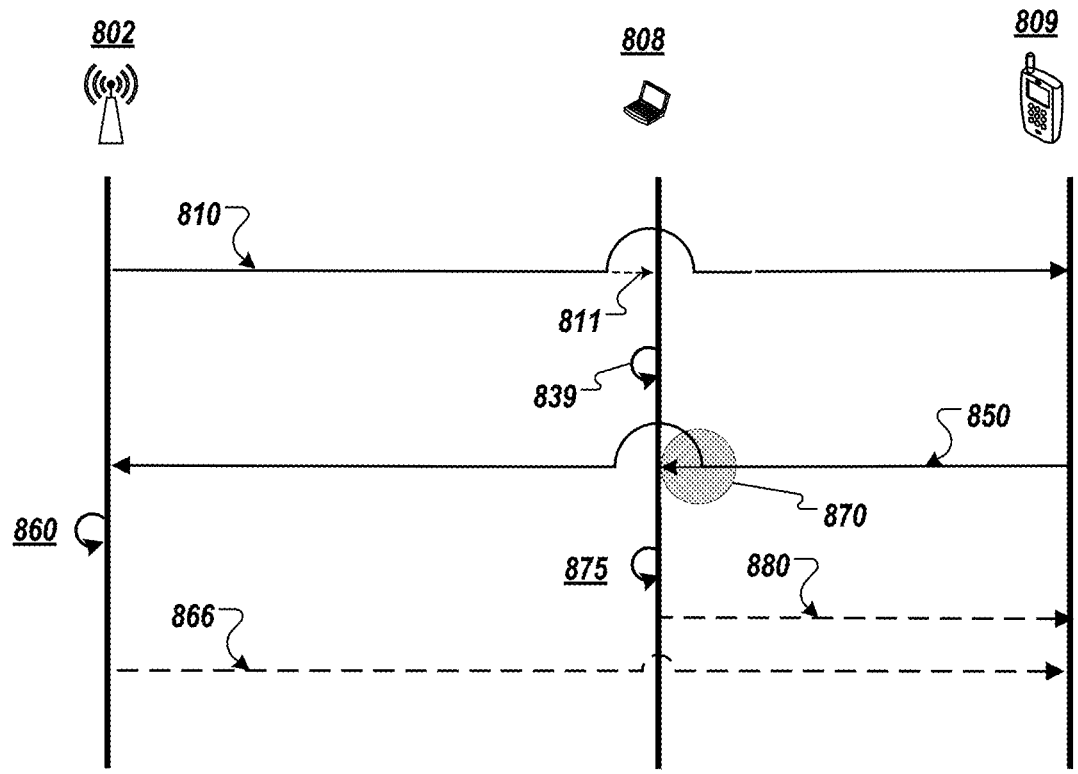
Figure 8C:
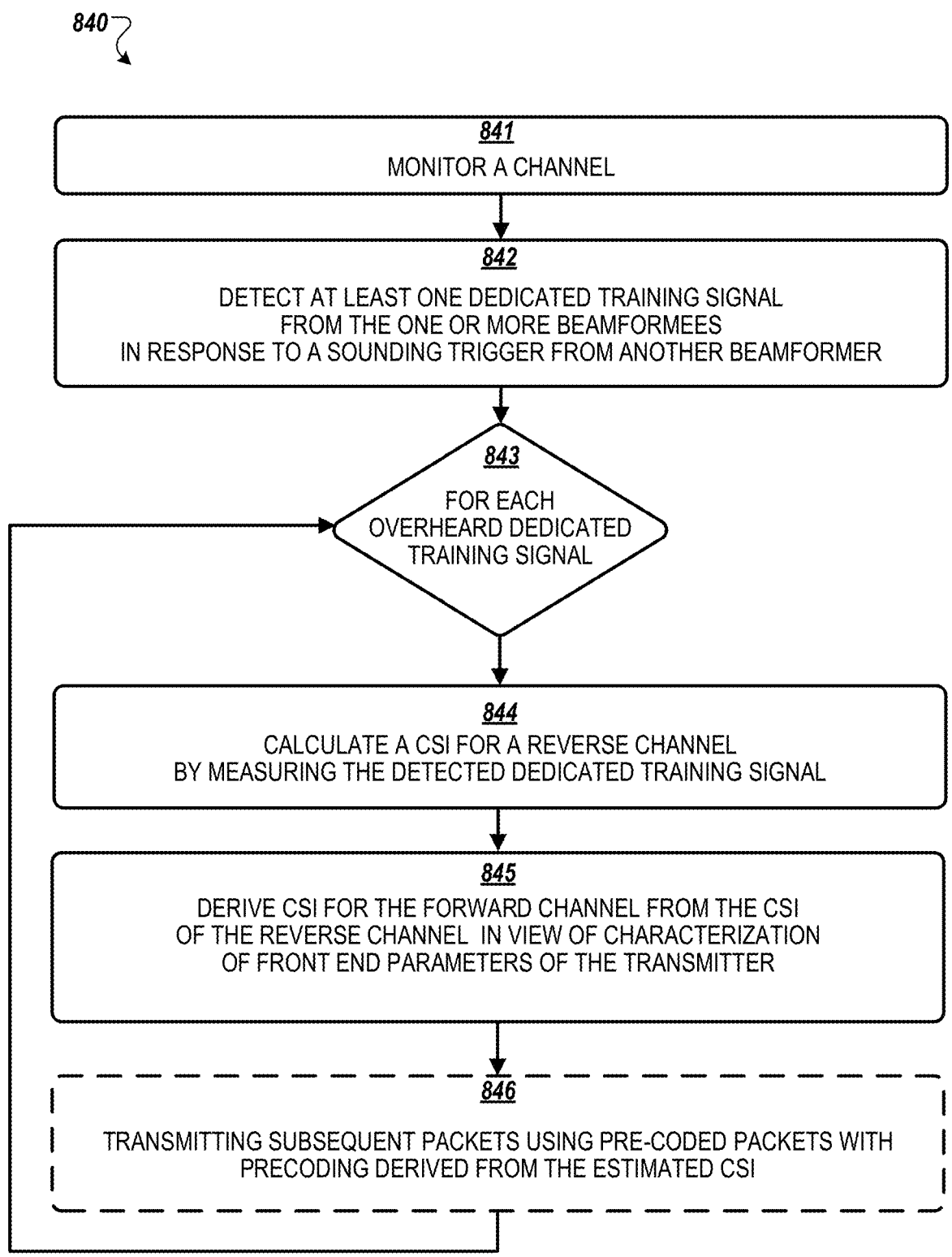

FIGS. 8A-C illustrate an example of sounding solicited by another beamformer in accordance with an example implementation. In an example implementation, solicited sounding by a first beamformer (e.g., access point 802) can enable one or more other beamformers (e.g., station 808) to estimate a forward channel 830 to the same station 809 without sending any sounding trigger.

FIG. 8A illustrates an example sequences of solicited sounding in accordance with an example implementation. In an example where the access point 802 is the beamformer sounding beamformee station 809, the access point to station (AP-STA) sounding channel can be described having both a AP-STA forward channel 820 from the beamformer access point 802 to the beamformee station 809 and an STA-AP reverse channel 821 from the beamformee station 809 to the beamformer access point 802. As discussed above, the beamformer access point 802 can send a single sounding trigger via the AP-STA forward channel 820 that is received by the beamformee station 809. The beamformee station 809 can send multiple dedicated training signals via the STA-AP reverse channel 821 in response to the single sounding trigger from the AP-STA forward channel 820 with minimal processing required.

In an example implementation, multiple beamformers can sound one or more beamformees based on a single solicited sounding trigger. Solicited sounding by a first beamformer (e.g., access point 802) can enable one or more other beamformers (e.g., station 808) to estimate a STA-STA forward channel 830 to the same station 809 without sending any sounding trigger. For example, the first beamformer access point 802 can send a sounding trigger via the AP-STA forward channel 820, the beamformee station 809 can respond with an NDP to the first beamformer access point 802 via the STA-AP reverse channel 821 that is overheard by the second beamformee station 808 via a STA-STA reverse channel 831.

In an example where the station 808 is a beamformer communicating with beamformee station 809, the sounding channel can be described having both a STA-STA forward channel 830 from the beamformer station 808 to the beamformee station 809 and a STA-STA reverse channel 831 from the beamformee station 809 to the beamformer station 808. For example as in a mesh network, the second station 808 can be a beamformee of the beamformer access point 802 and the second station 808 can be a beamformer of the beamformee station 809 among other combinations.

It should be noted that beamformers and beamformees as well as the channels are not limited to any number or combination of access points and stations. The examples described herein are exemplary and apply to any combinations communication devices with means for beamformers operations and/or means for beamformees operations.

In some implementation, the second station 808 can also receive the sounding trigger from the first beamformer (e.g., access point 802) via a second AP forward channel 822. In other implementation, the second station 808 can receive the dedicated training signal from the first station 809 independent of receiving the sounding trigger from the access point 802. The second station 808 can monitor a medium (e.g., via STA-STA reverse channel 831) for dedicated training signals from a beamformee station 809 to estimate a STA-STA forward channel 830 without sending a sounding trigger.

The beamformer station 808 can perform sounding for the STA-STA forward channel 830 based on overhearing the dedicated training signal via STA-STA reverse channel 831 that was sent by beamformee station 809 to access point 802 via AP reverse channel 821.

FIG. 8B illustrates an example sequence of multiple beamformers sounding beamformees based on a single solicited sounding trigger in accordance with an example implementation. At 810, access point 802 sends a sounding trigger, via the AP-STA forward channel 820, to the first station 809. At 811, the second station 808 may or may not also receive the same sounding trigger via another AP-STA forward channel 822.

At 836, the second station monitors a frequency of the STA-STA reverse channel 831 for dedicated training signals. Monitoring the frequency of STA-STA reverse channel 831 can detect transmission broadcast or sent on other sounding channels in the network (e.g., the AP-STA forward channel 820, the STA-AP reverse channel 821, the STA-STA reverse channel 831, another AP-STA forward channel 822, etc.). At 850, the first station 809 sends, via the AP reverse channel 821 one or more dedicated training signals to the access point 802 based on the sounding trigger. At 870, the second station 808 overhears, via the STA-STA reverse channel 831, the one or more dedicated training signals sent by the first station 809. At 875, the second station 808 processes the overheard dedicated training signals to estimate a forward CSI for STA-STA forward channel 830. At 880, the second station 808 can transmit subsequent packets, via STA-STA forward channel 830, to associated beamformee first station 809 based on the estimated forward CSI for the STA-STA forward channel 830.

At 860, the access point 802 processes the received dedicated training signals to estimate the forward CSI for the AP-STA forward channel 820. At 866, the access point 802 can transmit subsequent packets, via AP-STA forward channel 820, to associated beamformee first station 809 based on the estimated forward CSI for the AP-STA forward channel 820. Thus, multiple beamformers can sound one or more beamformees based on a single solicited sounding trigger.

FIG. 8C illustrates a flow diagram of an example sequences of a secondary beamformer sounding a beamformee based on a single solicited sounding trigger from a primary beamformee. The secondary beamformer process 840 starts at step 841 where a secondary beamformer (e.g., a non-soliciting beamformer, a piggybacking beamformer, etc.) is to monitor a communication medium as discussed in reference to FIGS. 8A-B.

At 842, the secondary beamformer process detects at least one dedicated training signal from one or more beamformees in response to a sounding trigger that was sent by another beamformer (e.g., a primary beamformer or solicitor beamformer). The secondary beamformer does not transmit a sounding trigger.

At 843, for each overhead dedicated training signal, the secondary beamformer process performs steps 844 and 845 to estimate a forward channel state information. At step 844, the secondary beamformer process calculates a CSI for a reverse channel by measuring the received dedicated training signal. At 845, the secondary beamformer process derives a CSI for the forward channel, from the CSI of the reverse channel in view of characterization of front end parameters of the transmitter.

In an example implementation, the secondary beamformer process can use the estimated forward CSI at 846 to transmit subsequent packets using precoded packets with precoding derived from the estimated CSI. The secondary beamformer process repeats, at least steps 844 and 845 for each overhead dedicated training signal associated with a beamformee that the secondary beamformer intends to communicate with. Accordingly, the solicited sounding framework requires less beamformer processing and less bandwidth than traditional sounding approaches.

Figure 9:
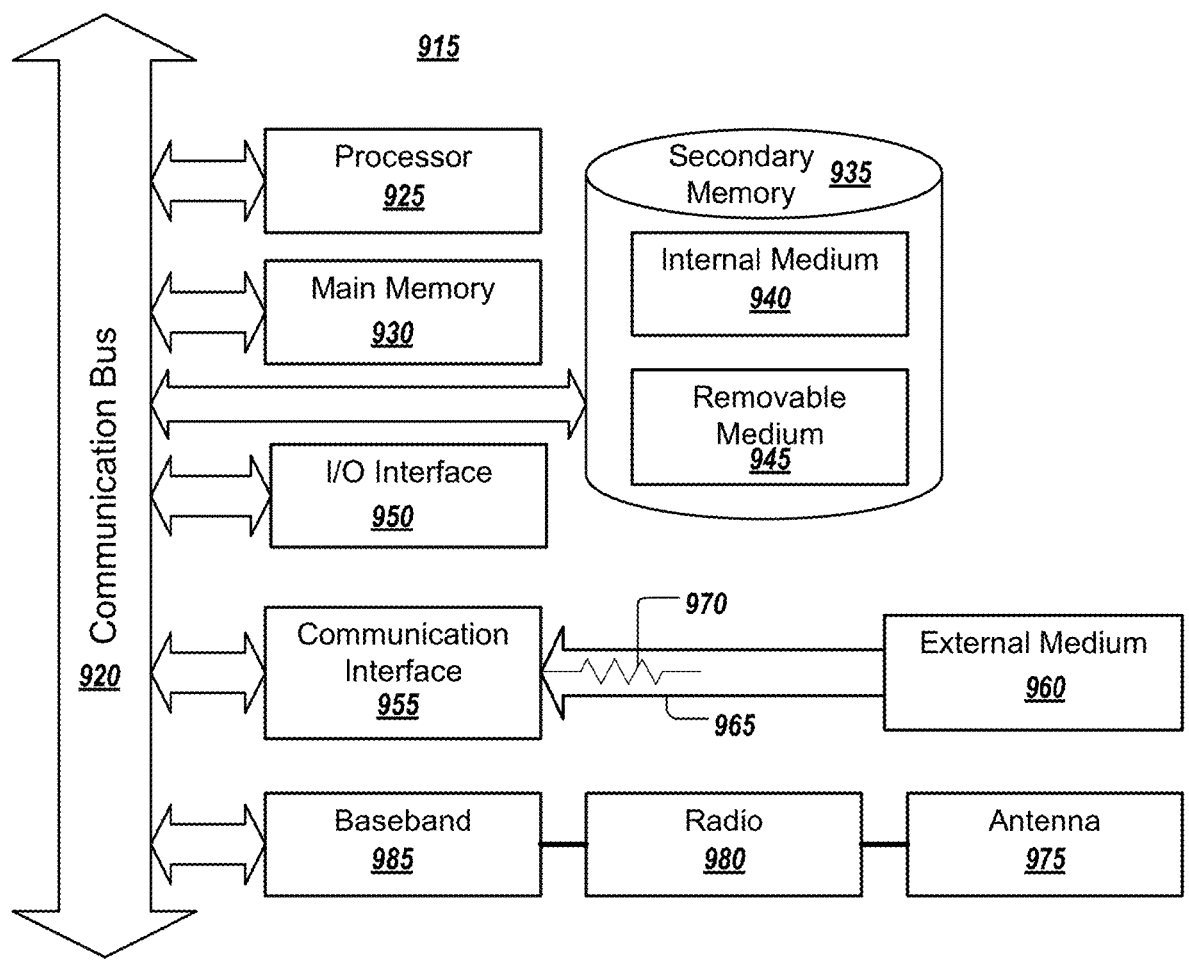
FIG. 9 illustrates a diagram of an example networking device in accordance with an example implementation.

FIG. 9 illustrates a diagram of an example networking device or system that may be used in connection with various example implementations described herein. For example the system 915 may be used as or in conjunction with one or more of the mechanisms or processes described above, and may represent components of processors, user system(s), and/or other devices described herein. The system 915 can be a networking device, a router, a server, a laptop, mobile device, or any conventional computer, or any other processor-enabled device that is capable of wired or wireless data communication. Other computer systems and/or architectures may be also used, as will be clear to those skilled in the art.

The system 915 preferably includes one or more processors, such as processor 925. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 925.

The processor 925 is preferably connected to a communication bus 920. The communication bus 920 may include a data channel for facilitating information transfer between storage and other peripheral components of the system 920. The communication bus 920 further may provide a set of signals used for communication with the processor 925, including a data bus, address bus, and control bus (not shown). The communication bus 920 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 802.11, IEEE 1188 general-purpose interface bus (GPIB), IEEE 696/S-30, and the like.

Processor(s) 925 can execute under any operating system (OS) (not shown), in a native or virtual environment. One or more applications can be deployed that include logic unit, application programming interface (API) unit or the like.

System 915 preferably includes a main memory 930 and may also include a secondary memory 935. The main memory 930 provides storage of instructions and data for programs executing on the processor 925, such as one or more of the functions and/or modules discussed above. It should be understood that programs stored in the memory and executed by processor 925 may be written and/or compiled according to any suitable language, including without limitation C/C++, Java, JavaScript, Pearl, Visual Basic, .NET, and the like. The main memory 930 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 935 may optionally include an internal memory 940 and/or a removable medium 945, for example a digital versatile disc (DVD) drive, other optical drive, a flash memory drive, etc. The removable medium 945 is read from and/or written to in a well-known manner. Removable storage medium 945 may be, for example, a floppy disk, magnetic tape, CD, DVD, SD card, etc. The removable storage medium 945 is a non-transitory computer-readable medium having stored thereon computer executable code (i.e., software) and/or data.

Other examples of secondary memory 935 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 945 and communication interface 955, which allow software and data to be transferred from an external medium 960 to the system 915.

System 915 may include a communication interface 955. The communication interface 955 allows software and data to be transferred between system 915 and external devices (e.g., printers), networks, or information sources. For example, computer software or executable code may be transferred to system 915 from a network server via communication interface 955. Examples of communication interface 955 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 915 with a network or another computing device.

Communication interface 955 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 955 are generally in the form of electrical communication signals 970. These signals 970 are preferably provided to communication interface 955 via a communication channel 965. In one example implementation, the communication channel 965 may be a wired or wireless network, or any variety of other communication links. Communication channel 965 carries signals 970 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 930 and/or the secondary memory 935. Computer programs can also be received via communication interface 955 and stored in the main memory 930 and/or the secondary memory 935. Such computer programs, when executed, enable the system 915 to perform the various functions of the present invention as previously described.

For example, communication interface 955 coupled to processor 925 can be configured to operate a wireless transceiver including transmitting a sounding trigger to one or more receivers, and receiving at least one dedicated training signal from the one or more receivers via a reverse channel in response to the sounding trigger. For each received dedicated training signal, it can estimate forward CSI derived based on the dedicated training signal from an associated receiver; and wherein subsequent packets are precoded with precoding derived from the forward CSI for transmission to the associated receiver via a forward channel.

According to an example implementation, the processor 925 can be configured to transmit additional sounding triggers to target additional receivers, where a separate additional dedicated training signal is received from each of the additional receivers in response to each additional sounding trigger, and where for each separate additional dedicated training signal received, the processor further estimates CSI for the additional receiver associated with the separate additional dedicated training signal; and transmits additional steering packets to the additional receiver based on the CSI. The sounding trigger is not preceded by an announcement frame and the receiver does not process the sounding trigger to generate detailed sounding feedback (e.g., a compress beamforming feedback based SVD).

In another example, communication interface 955 coupled to processor 925 can be configured to operate a wireless receiver including receiving a sounding trigger from a wireless transmitter, transmitting at least one dedicated training signal in response to the sounding trigger; and receiving subsequent packets with precoding derived from CSI information of the at least one dedicated training signal.

Transmitting at least one dedicated training signal in response to the sounding trigger can include transmitting multiple dedicated training signals without receiving another sounding trigger. In an example, the sounding trigger indicates a sounding schedule and training options for a format of the dedicated training signal, and the processor 925 is configured store the sounding schedule, calculate a response time for each of the one or more dedicated training signals based on the sounding schedule, and format the dedicated training signals based on the training options. The sounding schedule instructions can indicate sounding times to transmit a dedicated training signal coordinated with a group of receivers (e.g., sequentially, consecutively, simultaneously, in bursts, etc.). In other example implementations, the processor 925 is configured to determine the response time to transmit additional dedicated training signals without receive additional prompting by the beamformer. In the example, the wireless transceiver can transmit additional sounding triggers to target additional beamformees. For example, additional sounding triggers initiate a series of a separate additional dedicated training signal from each of the additional beamformees. Further, additional sounding triggers initiate a series of a separate additional dedicated training signal from each of the additional beamformees in response to each additional sounding trigger.

In an example, operating the wireless transceiver for estimating the forward CSI includes measuring channel information from the dedicated training signal received via the reverse channel, calculating a CSI for the reverse channel from the measured channel information, and deriving the forward CSI for the forward channel from the CSI for the reverse channel in view of characteristics of a radio frequency front end of the transceiver, wherein the subsequent packets are transmitted to the associated beamformee via the forward channel.

In some examples, a wireless transceiver apparatus includes multiple sets and/or subsets of antenna, a plurality of components coupled to one another to form transmit and receive chains, and a solicitor module circuit to transmit a sounding trigger, via a forward channel, to solicit multiple dedicated training signal from one or more beamformees. For example the dedicated training signals can be processed to improve subsequent transmissions of data to an associated beamformee (e.g., estimate a forward channel state information (CSI) for transmission of subsequent packets to associated beamformee).

The wireless transceiver with the solicitor module circuit generate the sounding trigger that indicates a control scheme (e.g., training options for a format of at least one of the multiple dedicated training signals based on communication parameters of a targeted beamformee). For example, communication parameters of a targeted beamformee include combination of one or more of a targeted beamformee capabilities, a traffic type, a positioning parameter, etc.

In further examples, the wireless transceiver with the solicitor module circuit may include a sounding module circuit coupled to the plurality of components. In other examples, a wireless without a transceiver solicitor module circuit may include a sounding module circuit coupled to the plurality of components. The sounding module circuit can process the dedicated training signals, for example when each received dedicated training signal, the sounding module circuit is to: measure channel information of the dedicated training signal received via a reverse channel, calculate a CSI for the reverse channel from the measured channel information, and derive the forward CSI for the forward channel from the CSI of the reverse channel in view of characteristics of a radio frequency front end of the transceiver.

In other examples, a wireless transceiver apparatus includes multiple sets and/or subsets of antenna, a plurality of components coupled to one another to form transmit and receive chains, and a sounding module circuit coupled to the multiple sets and/or subsets of antenna. The wireless transceiver in this example does not require a solicitor module circuit and can use dedicated training signals initially initiated by another wireless transceiver (e.g., a wireless transceiver with a solicitor module circuit). The sounding module circuit can detect at least one dedicated training signal from the one or more beamformees, wherein the at least one dedicated training signal is based on a sounding trigger from another beamformer.

18. The wireless transceiver apparatus of claim 15, wherein the sounding trigger indicates a sounding schedule with a time interval configured based on communication parameters of a targeted beamformee comprising at least one of: a targeted beamformee capabilities, a traffic type, and a positioning parameter.

Transmitting the at least one dedicated training signal can be performed by the communications interface 955 at timed intervals based on the sounding schedule indicated by the sounding trigger. In another example, transmitting at least one dedicated training signal can be based on monitoring for a preamble of other dedicated training signals from other receivers responding to the sounding trigger; deriving a packet length of the dedicated training signal based on the other dedicated training signals; and determining a response time based on the packet length.

In another embodiment, any of the described examples can include receiving at least one dedicated training signal with timing information. Such timing information can indicate packet transmit and receive timestamps. The timing information can be used for applications other than sounding processes such as motion tracking, location mapping, etc.

In this description, the term "computer readable medium" is used to refer to any non-transitory computer readable storage media used to provide computer executable code (e.g., software and computer programs) to the system 915. Examples of these media include main memory 930, secondary memory 935 (including internal memory 940, removable medium 945, and external storage medium 945), and any peripheral device communicatively coupled with communication interface 955 (including a network information server or other network device). These non-transitory computer readable mediums are means for providing executable code, programming instructions, and software to the system 915.

In an example implementation that is implemented using software, the software may be stored on a computer readable medium and loaded into the system 915 by way of removable medium 945, I/O interface 950, or communication interface 955. In such an example implementation, the software is loaded into the system 915 in the form of electrical communication signals 970.

In an example implementation, I/O interface 950 provides an interface between one or more components of system 915 and one or more input and/or output devices. Example input devices include, without limitation, keyboards, touch screens or other touch-sensitive devices, biometric sensing devices, computer mice, trackballs, pen-based pointing devices, and the like.

The system 915 also includes optional wireless communication components that facilitate wireless communication over a voice and over a data network. The wireless communication components comprise an antenna system 975, a radio system 980, and a baseband system 985. In the system 915, radio frequency (RF) signals are transmitted and received over the air by the antenna system 975 under the management of the radio system 980.

In one example implementation, the antenna system 975 may comprise one or more antennae and one or more multiplexors (not shown) that perform a switching function to provide the antenna system 975 with transmit and receive signal paths. In the receive path, received RF signals can be coupled from a multiplexor to a low noise amplifier (not shown) that amplifies the received RF signal and sends the amplified signal to the radio system 980.

In alternative example implementations, the radio system 980 may comprise one or more radios that are configured to communicate over various frequencies. In one example implementation, the radio system 980 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 980 to the baseband system 985.

If the received signal contains audio information, then baseband system 985 decodes the signal and converts it to an analog signal. Then the signal is amplified and sent to a speaker. The baseband system 985 also receives analog audio signals from a microphone. These analog audio signals are converted to digital signals and encoded by the baseband system 985. The baseband system 985 also codes the digital signals for transmission and generates a baseband transmit audio signal that is routed to the modulator portion of the radio system 980. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 975 where the signal is switched to the antenna port for transmission.

The baseband system 985 is also communicatively coupled with the processor 925. The central processing unit 925 has access to data storage areas 930 and 935. The central processing unit 925 is preferably configured to execute instructions (i.e., computer programs or software) that can be stored in the memory 930 or the secondary memory 935. Computer programs can also be received from the baseband processor 985 and stored in the data storage area 930 or in secondary memory 935, or executed upon receipt. Such computer programs, when executed, enable the system 915 to perform the various functions of the present invention as previously described. For example, data storage areas 930 may include various software modules (not shown).

Figure 10A:
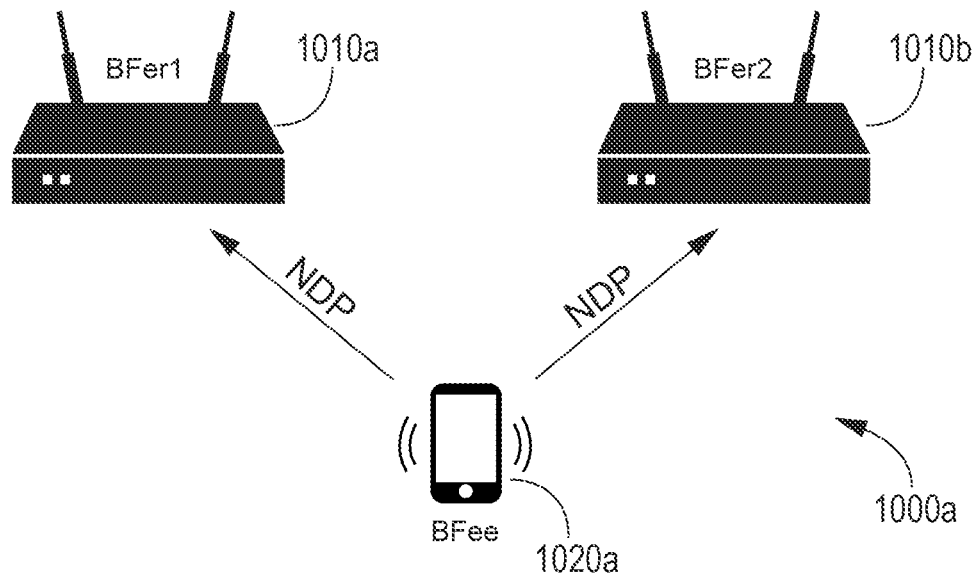
FIGS. 10A-10B illustrate example systems of channel sounding and beamformed communications in accordance with an example implementation.
Figure 10B:
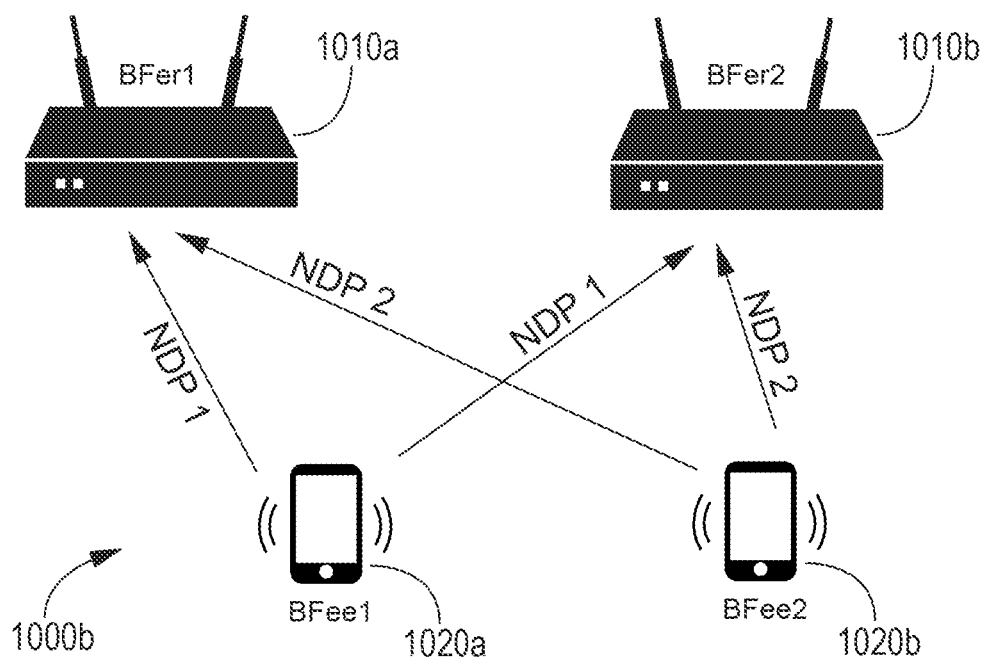

FIGS. 10A-10B illustrate example systems 1000a/1000b of channel sounding and beamformed communications in accordance with an example implementation. The system 1000a may include a first beamformer 1010a and a second beamformer 1010b in communication with a first beamformee 1020a, and the system 1000b may include the first and second beamformers 1010a/1010b and the first beamformee 1020a and a second beamformee 1020b.

In operation, the first beamformer 1010a may transmit a sounding trigger to the first beamformee 1020a in a similar or comparable manner to that described in the present disclosure, such as in FIGS. 5A-5G. For example, the sounding trigger can be a null data packet polling frame that is not preceded by an announcement frame. Unlike traditional explicit sounding techniques, solicited sounding enables the beamformer 1010a to trigger repeated information based on a single sounding trigger. In these and other embodiments, the first beamformee 1020a may respond to the sounding trigger with a dedicated training signal. As described herein, in solicited sounding the first beamformee 1020a does not measure channel information from the received sounding trigger. The one or more dedicated training signals sent by the first beamformee 1020a are triggered by the sounding trigger, but the dedicated training signal does not require measurements associated with the transmission of the sounding trigger. For example, the dedicated training signal can be a null data packet without a payload of sounding data. In these and other embodiments, the first beamformer 1010a may derive channel information to facilitate beamforming for communications between the first beamformer 1010a and the first beamformee 1020a. The derivation of such channel information by the first beamformer 1010a may be performed consistent with any of the examples described in the present disclosure, for example, the first beamformer 1020a may follow the beamformer process described with reference to FIG. 3.

In addition to being received at the first beamformer 1010a that transmitted the sounding trigger, the dedicated training signal may also be received by the second beamformer 1010b, even though the second beamformer 1010b did not transmit the sounding trigger. By listening to the dedicated training signal from the first beamformee 1020a, the second beamformer 1010b may derive its own respective channel information in a similar or comparable manner to that which the first beamformer 1010a derives. However, the second beamformer 1010b may obtain the dedicated training signal even without sending the sounding trigger. Such an arrangement may be beneficial in a mesh network or other arrangement in which multiple beamformers 1010 may service a given beamformee 1020. An explanation of an example series of messages for an embodiment with a single beamformee and multiple beamformers may be described in greater detail with reference to FIG. 11A.

In some embodiments, the second beamformer 1010b may have some form of relationship with the first beamformer 1010a. For example, a developer or manager of a WLAN may deploy and configure the first and second beamformers 1010a/1010b in a location such that the first beamformer 1010a sends the sounding trigger to cause the first beamformee 1020a to generate the dedicated training signal that both the first and the second beamformers 1010a/1010b receive. Such a physical configuration may include a mesh network or other network with multiple beamformers with overlapping coverage. As another example, the first beamformer 1010a and the second beamformer 1010b may be in a master/slave or a master/subordinate relationship where the first beamformer 1010a takes the initiative in sending out the sounding trigger and/or instructing the second beamformer 1010b when to send out a sounding trigger.

FIG. 10B illustrates the system 1000b in which multiple beamformees 1020 (such as first and second beamformees 1020a and 1020b) may be configured to receive the sounding trigger from the first beamformer 1010a and respond accordingly. For example, the sounding trigger may be directed to both the first beamformee 1020a and the second beamformee 1020b, and each may respond with its own respective dedicated training signal. In these and other embodiments, the single sounding trigger may facilitate the estimation of channel information for channels related to multiple beamformees (e.g., the first and second beamformees 1020a/1020b) for both the first beamformer 1010a and the second beamformer 1010b.

In some embodiments, the dedicated training signal may include instructions to the beamformees 1020 regarding the manner in which the dedicated training signals are to be transmitted. For example, the instructions may indicate that each beamformee is to transmit the dedicated training signals at a given point in time according to a schedule, or that the dedicated training signals are to be multiplexed in a particular manner. Examples of such implementations may be described in greater detail with reference to FIGS. 11B and 11C, respectively. Additionally or alternatively, the sounding trigger may include any of the information and/or instructions described herein with reference to FIG. 4B.

While FIGS. 10A and 10B illustrate two examples of potential arrangements of beamformers 1010 and beamformees 1020, it will be appreciated that any configuration and/or number of beamformers 1010 and beamformees 1020 are within the scope of the present disclosure. For example, in a mesh network there may be a large number of overlapping beamformers servicing a large number of beamformees.

Figure 11A:
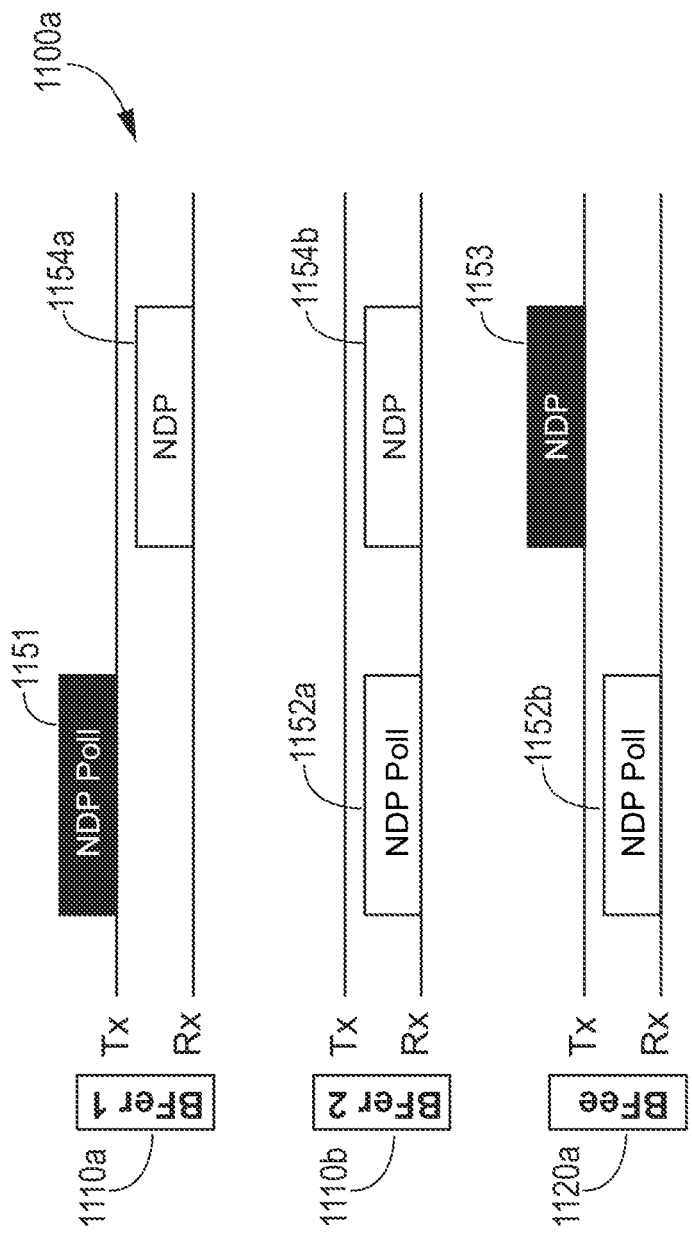
FIGS. 11A-11D illustrate additional example sequences of solicited sounding in accordance with various example implementations.
Figure 11B:
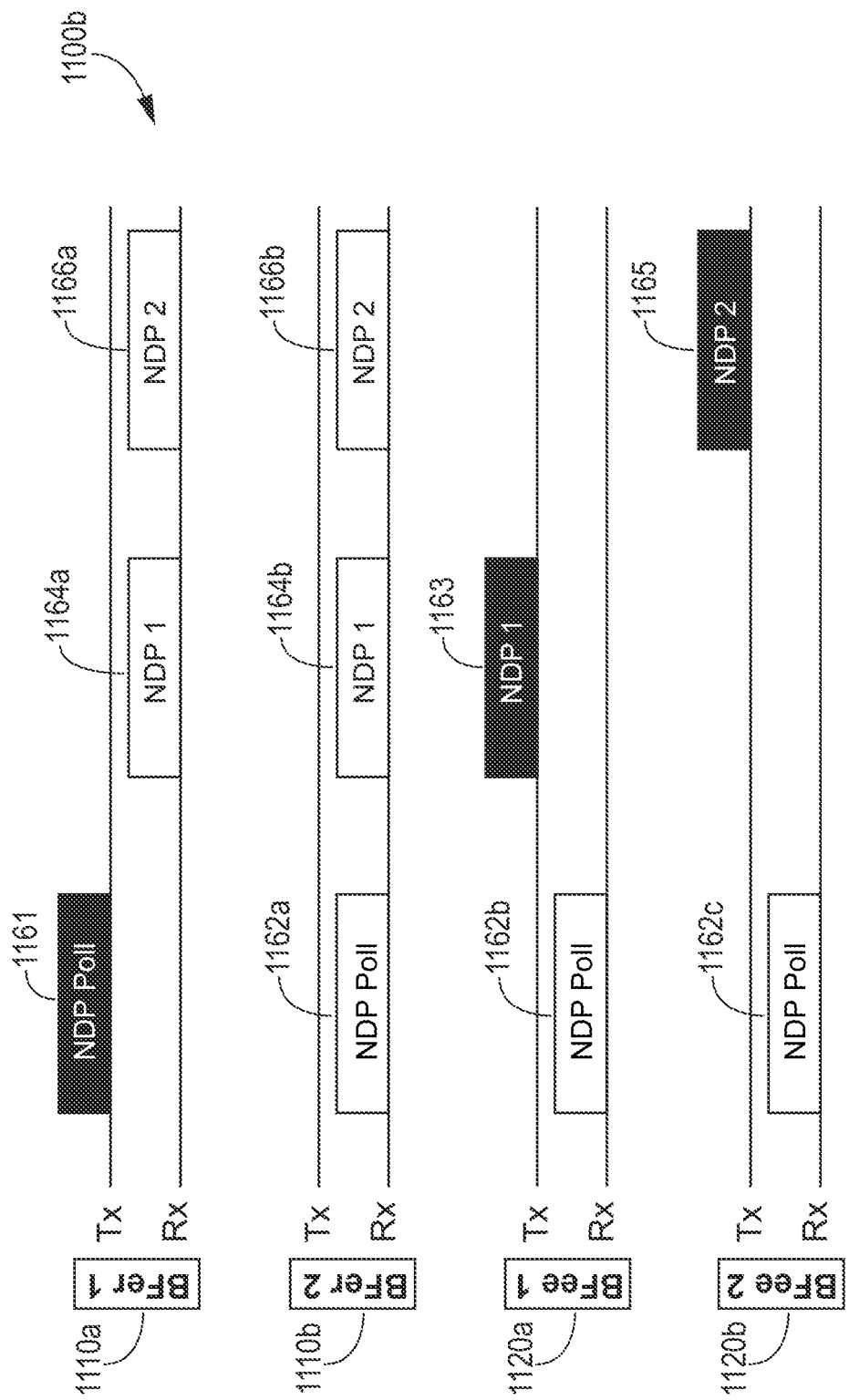
Figure 11C:
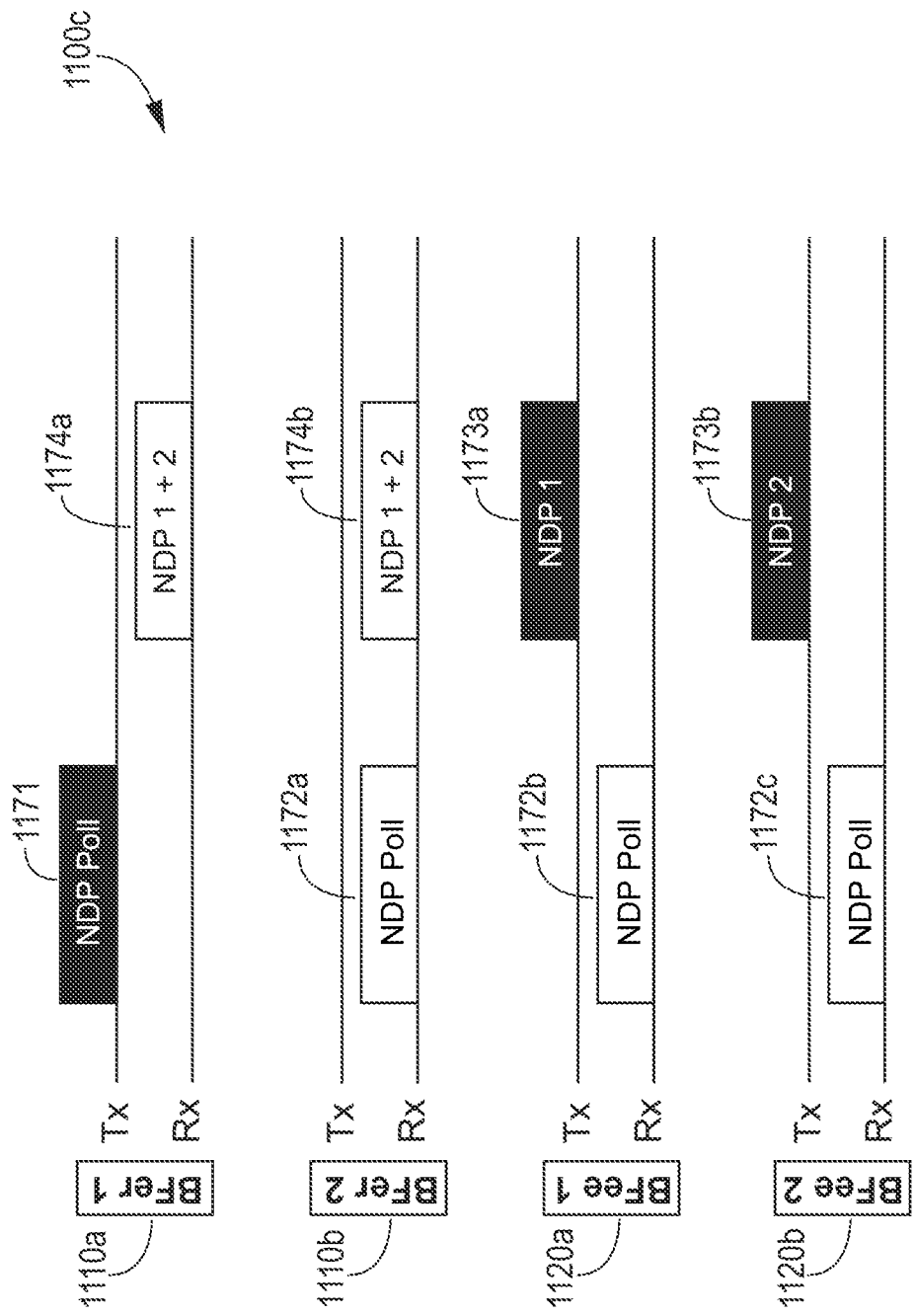
Figure 11D:
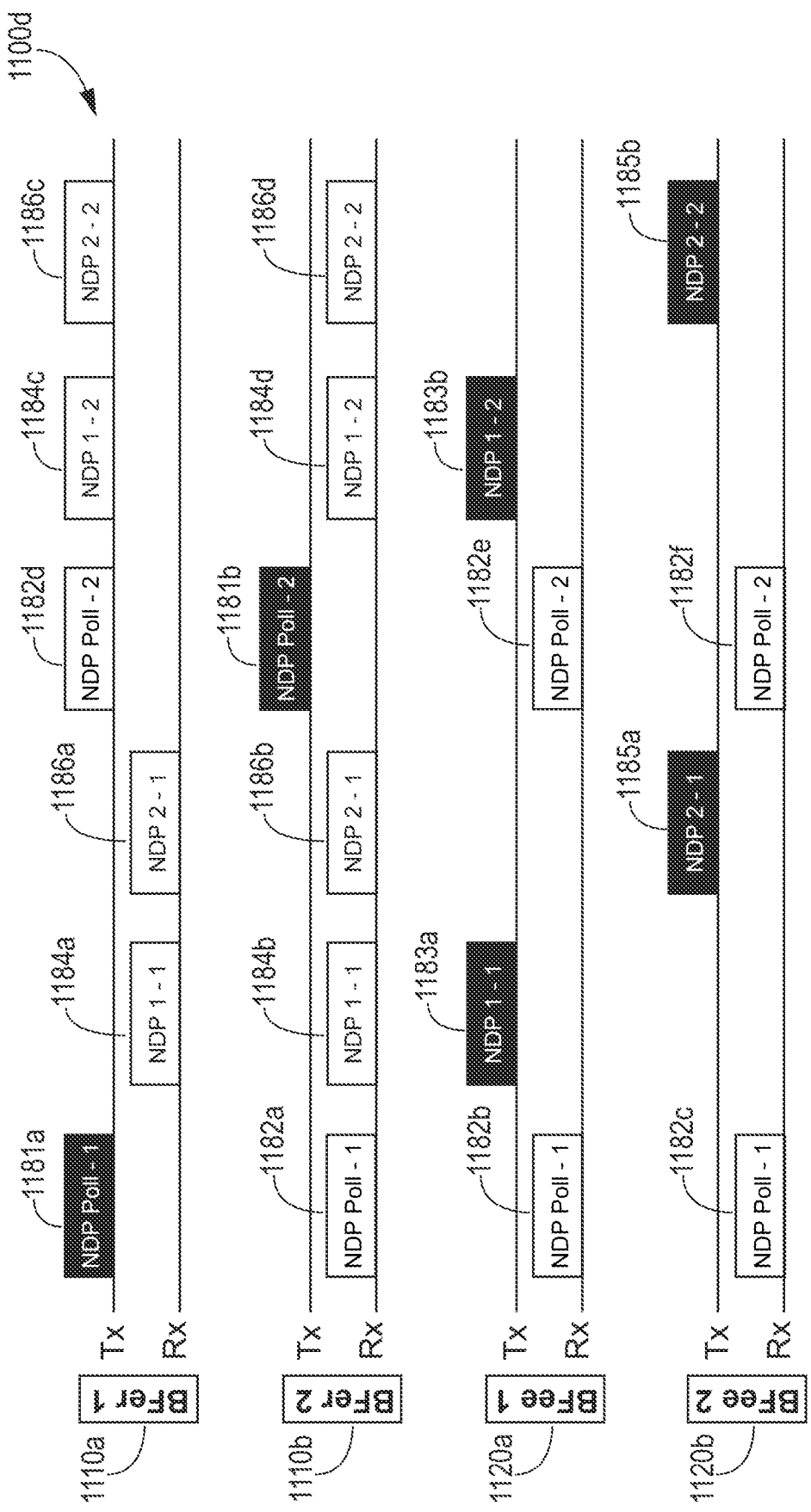

FIGS. 11A-11D illustrate additional example sequences of solicited sounding in accordance with various example implementations. The sequence 1100a of FIG. 11A illustrates an example embodiment with first and second beamformers 1110a and 1110b and a first beamformee 1120a. The sequence 1100b of FIG. 11B illustrates an example embodiment with the first and second beamformers 1110a/1110b and first and second beamformees 1120a/1120b, where the first and second beamformees 1120a/1120b respond in separate time slots. The sequence 1100c of FIG. 11C illustrates an example embodiment with the first and second beamformers 1110a/1110b and the first and second beamformees 1120a/1120b, where the first and second beamformees 1120a/1120b respond in a multiplexed manner. The sequence 1100d of FIG. 11D illustrates an example embodiment with the first and second beamformers 1110a/1110b and the first and second beamformees 1120a/1120b, where the first and second beamformees 1120a/1120b respond in separate time segments, and the second beamformer 1100b also transmits a second sounding trigger. While the sequences 1100a-1100d illustrate NDP Polls and NDP signals as the sounding trigger and the dedicated training signals, respectively, it will be appreciated that these serve as examples and any number of communications are within the scope of the present disclosure as the sounding trigger and dedicated training signals.

With reference to the sequence 1100a, the first beamformer 1110a may broadcast a sounding trigger, such as an NDP Poll 1151. The NDP poll 1151 may identify the first beamformer 1110a as the originator of the NDP Poll and may identify the first beamformee 1120a as the target recipient of the NDP Poll 1151. In some embodiments, the NDP Poll 1151 may include training options for the first beamformee 1120a when transmitting the dedicated training signal. For example, the NDP Poll 1151 may include schedule information of time segment(s) within which the beamformee 1120a is to send the dedicated training signal, or additional dedicated training signals. As another example, the NDP poll 1151 may include repeated symbols to be included in the dedicated training signal, partial bandwidth to be used when transmitting the dedicated training signal, a number of bits to be included in the dedicated training signal, etc. In some embodiments, the dedicated training signal does not include any user data that can be processed to estimate reverse channel information.

As illustrated in FIG. 11A, the second beamformer 1110b and the first beamformee 1120a may receive the NDP Poll as blocks 1152a and 1152b respectively. In response to receiving the NDP Poll 1151, the first beamformee 1120a may broadcast a dedicated training signal, such as the NDP 1153. The dedicated training signal may be received by both the first and second beamformers 1110a/1110b as blocks 1154a/1154b, respectively. In some embodiments, the first and second beamformers 1110a/1110b may reserve a given portion of network resource for receiving the NDP as blocks 1154/1154b. For example, the second beamformer 1110b may observe the schedule included in the NDP Poll 1152b and may reserve the corresponding given portion of network resources within which the first beamformee is scheduled to transmit the NDP 1153. In some embodiments, the portion of network resources may include time slots, portions of bandwidth, frequency ranges, resource units (RUs), etc.

After receiving the NDP 1153, each of the first and second beamformers 1110a/1110b may determine respective channel characteristics of the forward channels between the first and second beamformers 1110a/1110b and the first beamformee 1120a. For example, the second beamformer 1110b may estimate reverse channel characteristics based on the NDP 1153, and may use the estimate of the reverse channel characteristics to estimate the forward channel characteristics. The second beamformer 1110b can use the estimate of the forward channel characteristics to determine corresponding link matrix(s) used to adjust the forward channel precoding for subsequent transmissions of user data by the second beamformer 1110b to the first beamformee 1120a.

In some embodiments, the sequence 1100a may be particularly advantageous in circumstances in which the signal strength or other channel information between the first and second beamformers 1110a/1110b relative to a single beamformee (e.g., the first beamformee 1120a) are important. For example, when performing WiFi motion detection, the relative signal strength and/or other channel information between the first beamformee 1120a and the first and second beamformers 1110a/1110b may be used to detect and determine the direction of motion, the amount of motion, etc. By using the solicited sounding approach of the present disclosure, accurate channel information may be obtained with minimal increases to overhead and/or network usage. For example, only a single beamformer 1110a transmits the sounding trigger (e.g., the NDP Poll 1151) on behalf of multiple beamformers (such as the beamformers 1110a and 1110b) such that all of the multiple beamformers can estimate their respective channel characteristics with the beamformee 1120a with minimal network usage.

As illustrated in FIG. 11B, the sequence 1100b may initiate a solicited sounding process by the first beamformer 1110a transmitting the NDP Poll 1161. The NDP Poll 1161 may identify both the first and the second beamformees 1120a and 1120b as the target recipients of the NDP poll 1161. In these and other embodiments, the NDP Poll 1161 may be similar or comparable to the NDP Poll 1151 of FIG. 11A. The NDP Poll 1161 may be received by the second beamformer 1110b and the first and second beamformees 1120a/1120b as the blocks 1162a, 1162b, and 1162c respectively.

In the embodiment illustrated in FIG. 11B, the NDP Poll 1161 may include schedule information that is specific to each of the first and second beamformees 1120a/1120b. For example, the schedule information may indicate that the first beamformee 1120a is to transmit the NDP 1 1163 within a first time slot and the second beamformee 1120b is to transmit the NDP 2 1165 within a second time slot (as illustrated by the successive transmissions of NDP 1 1163 and NDP 2 1165 in FIG. 11B). The NDP 1 1163 may be received by both the first beamformer 1110a and the second beamformer 1110b as the blocks 1164a/1164b, respectively. The NDP 2 1165 may be received by both the first beamformer 1110a and the second beamformer 1110b as the blocks 1166a/1166b, respectively. After receiving the NDP 1 1163 and the NDP 2 1165, each of the first and second beamformers 1110a/1110b may determine respective channel characteristics of the forward channels between the first and second beamformers 1110a/1110b and the first and second beamformees 1120a/1120b. In these and other embodiments, the beamformees 1120a/1120b may obtain their schedule information and/or determine their time segment in a similar or comparable manner to that described with reference to FIGS. 5D and/or 5E.

The schedule may include any indication of timing and/or frequency of dedicated training signal transmission, with the sequence 1100b illustrating one example. As another example, the schedule may indicate that the first beamformee 1120a is to provide NDPs for four initial successive time slots followed by the second beamformee 1120b providing NDPs in the next four successive time slots. As a further example, the schedule may indicate that the first beamformee 1120a is to provide an NDP in one time slot, followed by the second beamformee 1120b providing an NDP in the next time slot, followed again by the first beamformee 1120a, and then followed again by the second beamformee 1120b. The schedule may provide a balanced number of NDP transmissions across all target beamformees, or may provide for one beamformee to transmit NDPs more frequently than another beamformee.

As illustrated in FIG. 11C, the sequence 1100c may initiate a solicited sounding process by the first beamformer 1110a transmitting the NDP Poll 1171. The NDP Poll 1171 may be similar or comparable to the NDP Polls 1151 and/or 1161 of FIGS. 11A and 11B. The NDP Poll 1171 may be received by the second beamformer 1110b and the first and second beamformees 1120a/1120b as the blocks 1172a, 1172b, and 1172c respectively.

The NDP Poll 1171 may include information indicating a portion of bandwidth, frequency range, and/or spatial streams within which the first and the second beamformees 1120a and 1120b are to transmit their respective NDPs 1173a and 1173b. For example, the first and second beamformers 1110a/1110b may include uplink MU-MIMO capability as described with reference to FIG. 5F, such that distinct data may be received from two or more MU-MIMO capable beamformees (such as the beamformees 1120a and 1120b) concurrently. Continuing the example, the NDP Poll 1171 may indicate a target spatial stream for the first beamformee 1120a and another target spatial stream for the second beamformee 1120b such that the NDP 1 1173a and the NDP 2 1173b may be multiplexed and received at the same time. In some embodiments, the NDP Poll 1171 may operate as a time reference point for the first and second beamformees 1120a/1120b such that the NDP 1 1173a and the NDP 2 1173b may be transmitted in a coordinated manner.

In these and other embodiments, both the first and second beamformers 1110a/1110b may receive the multiplexed NDP 1+2 as the blocks 1174a 1174b, respectively. The first and second beamformers 1110a/1110b may use the dedicated training signals (e.g., NDP 1 1173a and NDP 2 1173b) to estimate the forward channel characteristics.

As illustrated in FIG. 11D, the sequence 1100d may initiate a solicited sounding process by the first beamformer 1110a transmitting the NDP Poll-1 1181a. The NDP Poll-1 1181a may be similar or comparable to the NDP Polls 1151, 1161, and/or 1171 of FIGS. 11A-C. The NDP Poll-1 1181a may be received by the second beamformer 1110b and the first and second beamformees 1120a/1120b as the blocks 1182a, 1182b, and 1182c respectively.

The NDP Poll-1 1181a may include schedule information for the first and second beamformees 1120a and 1120b in a similar or comparable manner to that illustrated in FIG. 11B. Additionally or alternatively, the NDP Poll-1 1181a may include information for other beamformers listening in, such as the second beamformer 1110b. For example, the NDP Poll-1 1181a may establish a master-slave relationship between the first beamformer 1110a and the second beamformer 1110b. In such a relationship, the second beamformer 1110b may take certain actions or avoid certain actions based on instructions from the first beamformer 1110a. In some embodiments, such a message may include a schedule indicating a frequency or triggering event upon which a target beamformer is to transmit an additional sounding trigger. For example, as illustrated in FIG. 11D, the second beamformer 1110b may transmit a second sounding trigger as the NDP Poll-2 1181b based on instructions included in the NDP Poll-1 1181a from the first beamformer 1110a.

In some embodiments, the first beamformer 1110a and the second beamformer 1110b may have a preexisting relationship. For example, a developer/engineer may deploy both the first beamformer 1110a and the second beamformer 1110b in a mesh network or other network in which the first beamformer 1110a and the second beamformer 1110b may be aware of each other and/or communicate with each other. In these and other embodiments, a master-slave relationship may or may not be established prior to transmission of the NDP Poll-1 1181a. When aware of the second beamformer 1110b, the first beamformer 1110a may include explicit instructions targeted to the second beamformer 1110b, such as informing the second beamformer 1110b that it is a slave to the first beamformer 1110a, a schedule for sending sounding triggers, etc.

In some embodiments, the first beamformer 1110a may not be aware of the second beamformer 1110b before the transmission of the NDP Poll-1 1181a. In these and other embodiments, the NDP Poll-1 1181a may include instructions to any listening beamformers. For example, if the NDP Poll-1 1181a includes a schedule for another beamformer to send a second NDP Poll at a given time, the first beamformer 1110a may wait until a timeout period after the given time has elapsed to observe whether or not another beamformer transmits an NDP Poll. In such an embodiment, even two unrelated beamformers may enjoy the benefits of reduced overhead using the solicited sounding approaches of the present disclosure.

For example, with reference to FIG. 11D, the first beamformer 1110*a* may transmit the NDP Poll-1 1181*a* (received by the second beamformer 1110*b* and the first and second beamformees as the blocks 1182*a*-*c*, respectively). In response, the first beamformee 1120*a* may submit NDP1-1 1183*a* (received by the first and second beamformers 1110*a* and 1110*b* as blocks 1184*a* and 1184*b*) at a first time and the second beamformee 1120*b* may submit NDP1-1 1185*a* (received by the first and second beamformers 1110*a* and 1110*b* as blocks 1186*a* and 1186*b*) at a second time. The NDP Poll-1 1181*a* may include instructions for the second beamformer 1110*b* (whether based on a pre-existing relationship, a relationship established via the NDP Poll-1 1181*a*, or based on including instructions for any listening beamformer) to transmit NDP Poll-2 1181*b* at a given time. The first beamformer 1110*a* may receive the NDP Poll-2 1181*b* as the block 1182*d* at the given time, and may thus avoid sending a second NDP Poll as another beamformer (the second beamformer 1110*b*) transmitted an NDP Poll. In response to the NDP Poll-2 1181*b* (received by the first and second beamformees as 1182*e* and 1182*o*, the first beamformee 1120*a* may submit NDP1-2 1183*b* (received by the first and second beamformers 1110*a* and 1110*b* as blocks 1184*c* and 1184*d*) at a third time and the second beamformee 1120*b* may submit NDP2-2 1185*b* (received by the first and second beamformers 1110*a* and 1110*b* as blocks 1186*c* and 1186*d*) at a fourth time.

Using the NDP 1-1 1184*a*/1184*b*, the first beamformer 1110*a* and/or the second beamformer 1110*b* may estimate forward channel information for communicating with the first beamformee 1120*a*. Additionally, the forward channel information may be updated based on the NDP 1-2 1184*c*/1184*d*. Using the NDP 2-1 1186*a*/1186*b*, the first beamformer 1110*a* and/or the second beamformer 1110*b* may estimate forward channel information for communicating with the second beamformee 1120*b*. Additionally, the forward channel information may be updated based on the NDP 2-2 1186*c*/1186*d*.

Modifications, additions, or omissions may be made to any of the sequences illustrated in FIGS. 11A-11D. Furthermore, any of the sequences illustrated in FIGS. 5A-5G are also equally applicable to the embodiments in which a second beamformer (or additional beamformers) are listening to the responses and also estimating their own respective forward channel characteristics.

Figure 12:
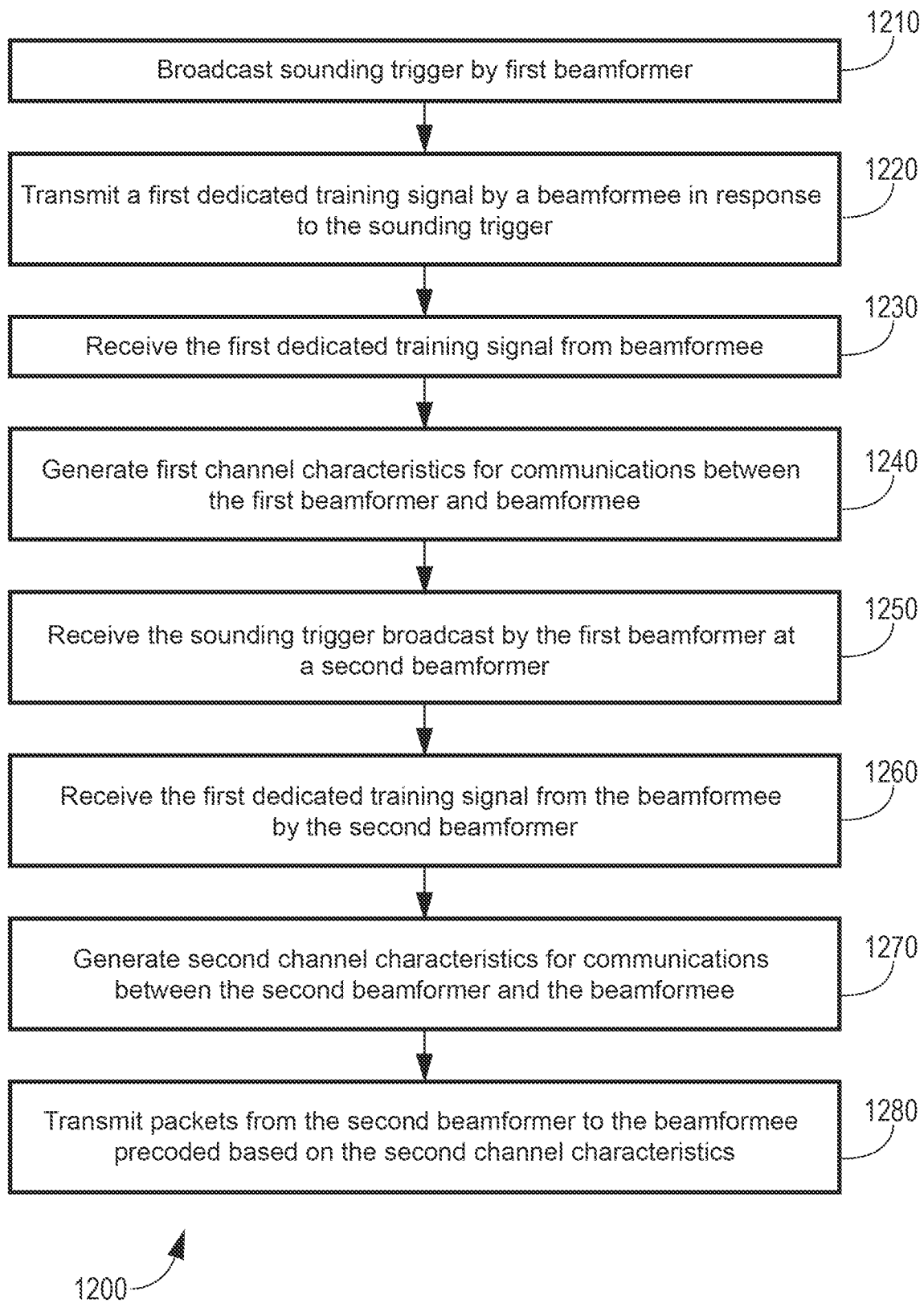
FIGS. 12-15 illustrate flow diagrams of example solicited sounding beamformee processes in accordance with example implementations.
Figure 13:
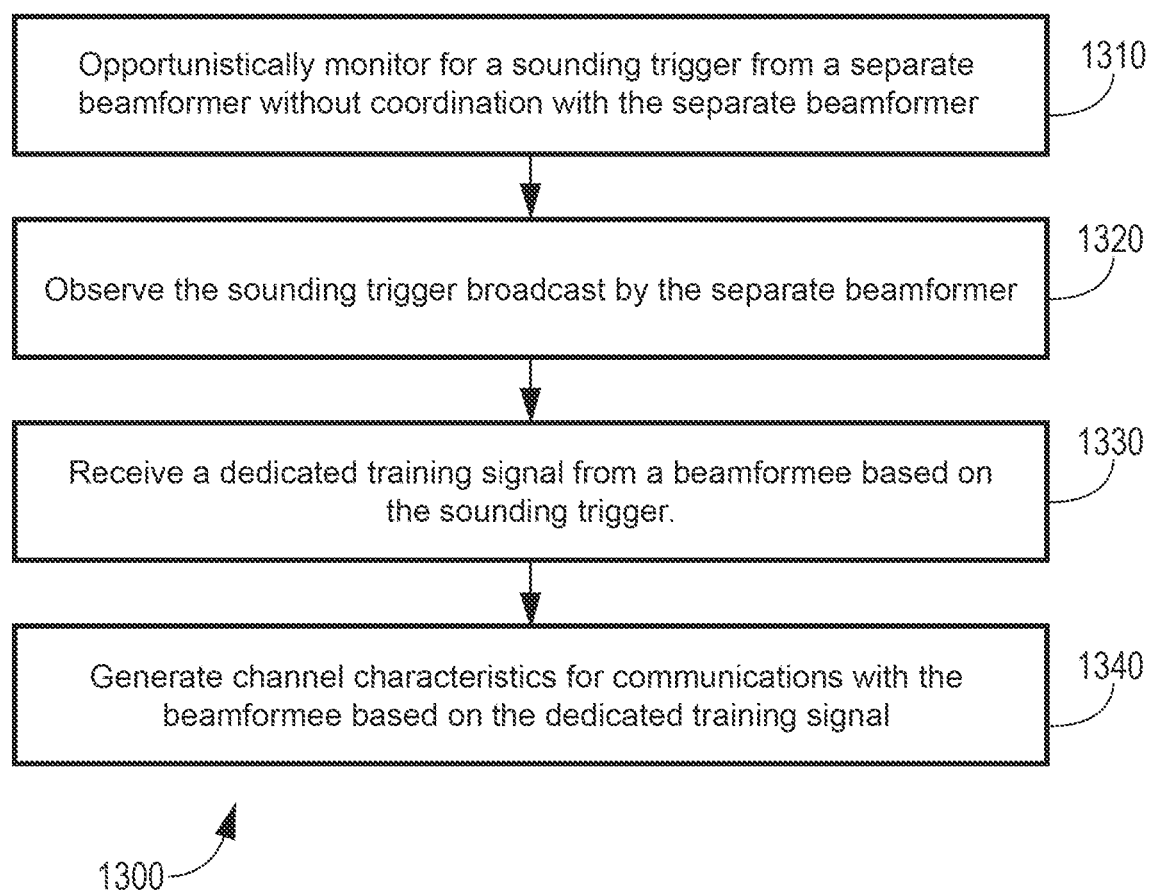
Figure 14:
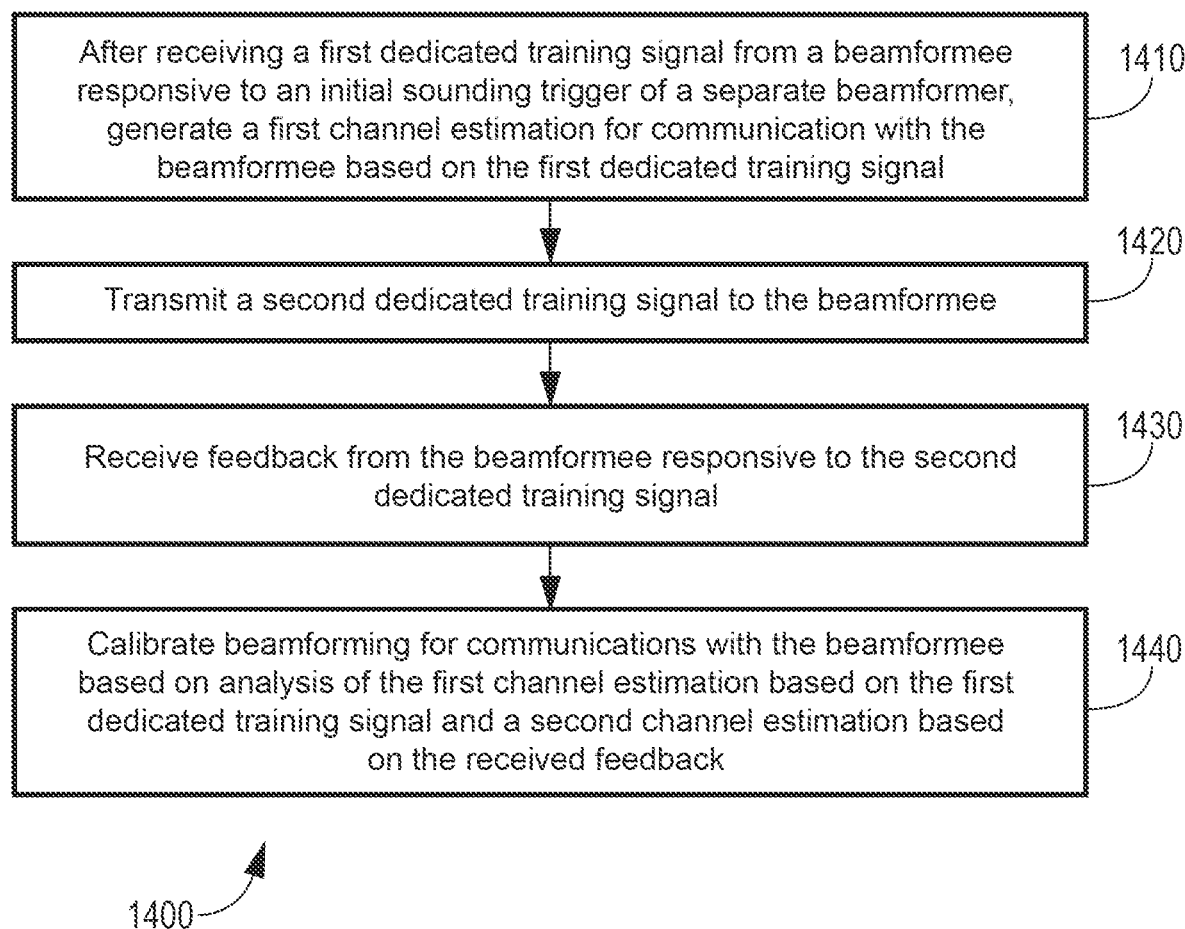
Figure 15:
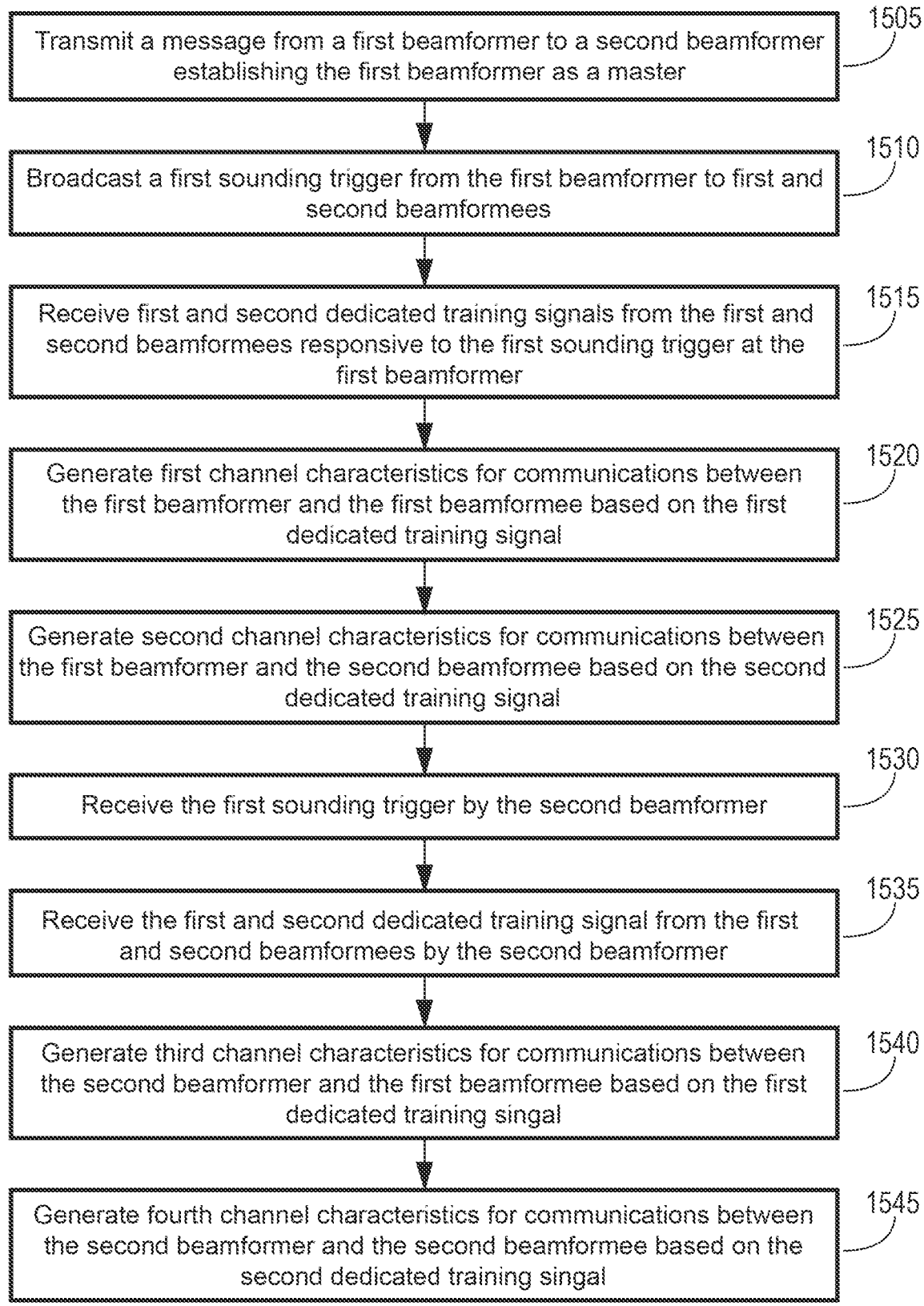

FIGS. 12-15 illustrate flow diagrams of example solicited sounding processes in accordance with example implementations. FIG. 12 illustrates an example implementation of two beamformers performing the solicited sounding process with a single beamformee where only the first beamformer sends a sounding trigger. FIG. 13 illustrates an example implementation in which the second beamformer (that does not send the sounding trigger) has no pre-existing relationship with the first beamformer (that sends the sounding trigger). FIG. 14 illustrates an example implementation in which the effectiveness of the solicited sounding process is calibrated. FIG. 15 illustrates an example implementation of two beamformers performing the solicited sounding process with two beamformees, and where the first beamformer is the master over the second beamformer.

Returning to FIG. 12, at block 1210, a sounding trigger may be broadcast by a first beamformer. For example, a wireless access point may send a sounding trigger that identifies one or more stations to which the wireless access point is targeted to initiate the solicited sounding process. The sounding trigger may or may not include instructions to the target station indicating when and/or how a responsive dedicated training signal is to be sent. For example, the sounding trigger may indicate a target time slot and/or target spatial stream within which the targeted station is to transmit the dedicated training signal.

At block 1220, a dedicated training signal may be broadcast by a beamformee in response to the sounding trigger. For example, the targeted station may respond with an NDP message. The NDP message may be sent according to the instructions provided in the sounding trigger.

At block 1230, the dedicated training signal from the beamformee may be received by the first beamformer. For example, the first beamformer may reserve the target time slot and/or the target spatial stream within which the beamformee is instructed to send the dedicated training signal.

At block 1240, first channel characteristics for communications between the first beamformer and the beamformee may be generated. For example, the first beamformer may use the dedicated training signal to estimate characteristics of a reverse channel from the beamformee to the beamformer, and may use the characteristics of the reverse channel to estimate the characteristics of a forward channel from the first beamformer to the beamformee (e.g., the first channel).

At block 1250, the sounding trigger broadcast by the first beamformer may be received at a second beamformer. The second beamformer may or may not have a preexisting relationship with the first beamformer. The second beamformer may analyze and/or observe any instructions within the sounding trigger such that the second beamformer may be aware of what time and in what manner any targeted beamformees are to transmit dedicated training signals. Additionally, the second beamformer may analyze which beamformees are targeted by the sounding trigger such that for beamformees that are inapplicable to the second beamformer, the second beamformer may be agnostic to and/or otherwise ignore dedicated training signals from such beamformees.

In some embodiments, the sounding trigger may include information for the second beamformer. For example, the sounding trigger may include instructions establishing a master-slave relationship between the first beamformer and the second beamformer.

At block 1260, the second beamformer may receive the dedicated training from the beamformee. For example, based on the instructions in the sounding trigger received at the block 1250, the second beamformer may reserve the time slots and/or spatial streams within which the beamformee may be instructed to transmit the dedicated training signal.

At block 1270, second channel characteristics for communications between the second beamformer and the beamformee may be generated. For example, the second beamformer may measure channel information of the dedicated training signal received via a reverse channel, calculate a CSI for the reverse channel from the measured channel information, and derive the forward CSI for the forward channel from the CSI of the reverse channel in view of characteristics of the second beamformer (e.g., a number of transmit and receive chains, antenna, etc.). In these and other embodiments, the second beamformer may use the estimation of the forward channel to determine a corresponding link matrix used to adjust the forward channel precoding for subsequent transmissions of user data to the beamformee.

At block 1280, packets may be transmitted from the second beamformer to the beamformee precoded based on the second channel characteristics. For example, user data may be transmitted to the beamformee and precoded using the updated precoding of the block 1270. In these and other embodiments, the first beamformer may also transmit packets to the beamformee using updated precoding according to the solicited sounding process of the present disclosure. For example, the first beamformer may update its precoding based on the first channel characteristics generated at the block 1240.

Returning to FIG. 13, at block 1310, an opportunistic beamformer may opportunistically monitor for a sounding trigger from a separate beamformer without coordination with the separate beamformer. For example, the opportunistic beamformer may be configured to monitor for sounding triggers being transmitted by any other beamformer, and may analyze any such sounding triggers received.

At block 1320, the sounding trigger broadcast by the separate beamformer may be observed. For example, the separate beamformer may transmit the sounding trigger, and based on the monitoring, the sounding trigger may be received and/or analyzed by the opportunistic beamformer. In some embodiments, the opportunistic beamformer may observe beamformees identified in the sounding trigger and may determine whether or not the identified beamformees are communicating with or otherwise have some association with the opportunistic beamformer. Additionally or alternatively, the opportunistic beamformer may observe instructions to the beamformees of when and/or how to transmit a dedicated training signal.

At block 1330, a dedicated training signal from a beamformee may be received at the opportunistic beamformer, where the dedicated training signal may be sent in response to the sounding trigger of the separate beamformer. For example, based on the instructions in the sounding trigger, the opportunistic beamformer may reserve a certain time window and/or spatial stream within which the dedicated training signal is to be transmitted.

At block 1340, channel characteristics for communications with the beamformee may be generated based on the dedicated training signal. For example, the opportunistic beamformer may follow a process comparable or similar to that described with reference to the second beamformer at the block 1270.

Returning to FIG. 14, at block 1410, after receiving a first dedicated training signal from a beamformee responsive to an initial sounding trigger of a separate beamformer, a first channel estimation may be generated for communication with the beamformee based on the first dedicated training signal. For example, the separate beamformer may send a sounding trigger to which the beamformee responds with the first dedicated training signal. A calibrating beamformer may generate the first channel estimation of a forward channel between the calibrating beamformer and the beamformee based on the dedicated training signal in a similar or comparable manner to that described with reference to the second beamformer at the block 1270.

At block 1420, a second dedicated training signal may be transmitted to the beamformee. For example, the calibrating beamformer may initiate an explicit sounding process by sending the second dedicated training signal to the beamformee. In these and other embodiments, the second dedicated training signal may include a series of communications, such as an NDPA frame, followed by an NDP.

At block 1430, feedback may be received from the beamformee that is responsive to the second dedicated training signal. For example, the beamformee may perform some processing on the NDP received from the calibrating beamformer (e.g., analyzing the training fields and calculating a feedback matrix) and may send the feedback matrix in response.

At block 1440, the calibrating beamformer may calibrate its beamforming for communications with the beamformee based on an analysis of the first channel estimation (based on the first dedicated training signal) and a second channel estimation (based on the received feedback). For example, the calibrating beamformer may compare the first channel estimation based on the solicited sounding process with the second channel estimation based on explicit sounding. The calibrating beamformer may identify any differences and may use the differences between the two channel estimations to derive a correction factor or algorithm that may be applied to any further channel estimations performed using the solicited sounding process. Using such an approach, the calibrating beamformer may verify the accuracy of the beamforming using the solicited sounding process and may provide a correction to improve such beamforming without having to use explicit sounding each time that an update to the precoding is desired. Rather, the solicited sounding process may be used with a single (or rare/periodic use) of explicit sounding to facilitate calibration of the solicited sounding process.

While following the example of a calibrating beamformer that did not send the initial sounding trigger of the solicited sounding process, it will be appreciated that a beamformer that sends the sounding trigger may also apply the same calibration process represented by the blocks 1420, 1430, and/or 1440.

Returning to FIG. 15, at block 1505, a message may be transmitted from a first beamformer to a second beamformer establishing the first beamformer as a master. For example, the message may indicate one or more beamformers that are to be slaves to the first beamformer transmitting the message, a duration for which they will be slaves, etc. The message may also indicate triggering events and/or a schedule according to which the first beamformer and the second beamformer are to send sounding triggers.

At block 1510, a first sounding trigger may be broadcast from the first beamformer to first and second beamformees. For example, based on the first beamformer being the master, the first beamformer may transmit the first sounding trigger to initiate a solicited sounding process with each of the first and second beamformees. The first sounding trigger may identify each of the first and second beamformees as targets of the sounding trigger. Additionally or alternatively, the first sounding trigger may identify each of the first and second beamformers as recipients seeking dedicated training signals. In some embodiments, the message establishing the slave-master relationship of the block 1505 may be included in the first sounding trigger.

At block 1515, first and second dedicated training signals responsive to the first sounding trigger may be received from the first and second beamformees at the first beamformer. For example, the dedicated training signals may be sent in successive time segments (such as illustrated in FIG. 11B) or may be multiplexed (such as illustrated in FIG. 11C).

At block 1520, first channel characteristics for communications between the first beamformer and the first beamformee (e.g., the forward channel from the first beamformer to the first beamformee) may be generated based on the first dedicated training signal. For example, the first beamformer may follow a process comparable or similar to that described with reference to the second beamformer at the block 1270.

At block 1525, second channel characteristics for communications between the first beamformer and the second beamformee (e.g., the forward channel from the first beamformer to the second beamformee) may be generated based on the second dedicated training signal. The block 1525 may be similar or comparable to the block 1520, although performed for the second channel characteristics based on the second dedicated training signal.

At block 1530, the first sounding trigger may be received by the second beamformer. For example, the first sounding trigger may inform the second beamformer it is now a slave to the first beamformer. As another example, the first sounding trigger may include instructions of how and/or when the first and second beamformees are to transmit the respective dedicated training signals.

At block 1535, the first and second dedicated training signals responsive to the first sounding trigger may also be received from the first and second beamformees at the second beamformer. For example, the second beamformer may reserve any time slots and/or spatial streams identified in the sounding trigger for the first and second dedicated training signals.

At block 1540, third channel characteristics for communications between the second beamformer and the first beamformee (e.g., the forward channel from the second beamformer to the first beamformee) may be generated based on the first dedicated training signal. The block 1540 may be similar or comparable to the block 1520, although performed by the second beamformer for the third channel characteristics based on the first dedicated training signal.

At block 1545, fourth channel characteristics for communications between the second beamformer and the second beamformee (e.g., the forward channel from the second beamformer to the second beamformee) may be generated based on the second dedicated training signal. The block 1545 may be similar or comparable to the block 1520, although performed by the second beamformer for the fourth channel characteristics based on the second dedicated training signal.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs.

An example apparatus can include a Wireless Access Point (WAP) or a station and incorporating a very-large-scale integration (VLSI) processor and program code to support. An example transceiver couples via an integral modem to one of a cable, fiber or digital subscriber backbone connection to the Internet to support wireless communications, e.g., IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

The WAP and/or station can support multiple protocols and multilingual with the ability to communicate with multiple protocols, for example Internet of Things protocols including Bluetooth-Low-Energy, Zigbee, Thread, etc. and communicatively coupled to one or more resources for access to analytics or machine-learning capabilities. In some implementations, the WAP and/or station is battery powered and mobile or integrated a larger mobile device such as an automobile or airplane.

An example apparatus can be multiple-input multiple-output (MIMO) apparatus supporting as many as N×N discrete communication streams over N antennas. In an example the MIMO apparatus signal processing units can be implemented as N×N. In various examples, the value of N can be 4, 6, 8, 12, 16, etc. Extended MIMO operation enable the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

In some implementations, beamforming antenna configuration sounding discussed herein, may be applied with equal advantage to WAPs or stations with any number of transmit chains, receive chains, or MIMO antenna, including but not limited to: 1×2, 1×n, 2×3, 2×4, 2×n, 3×4, 3×n, 4×5, 4×8, 4×n, 8×9, 8×16, 8×n, etc.; without departing from the disclosure. The components and processes disclosed herein may be implemented in a combination of software, circuits, hardware, and firmware, integrated with the WAP's existing transmit and receive path components, and without departing from the scope of the disclosure.

Example transmit path/chain includes the following discrete and shared components. A WiFi medium access control (WMAC) component includes: hardware queues for each downlink and uplink communication stream; encryption and decryption circuits for encrypting and decrypting the downlink and uplink communication streams; medium access circuit for making the clear channel assessment (CCA), and making exponential random backoff and re-transmission decisions; and a packet processor circuit for packet processing of the transmitted and received communication streams. The WMAC component has access to a node table which lists each node/station on the WLAN, the station's capabilities, the corresponding encryption key, and the priority associated with its communication traffic.

Each sounding or data packet for wireless transmission on the transmit path components to one or more stations is framed in the framer. Next each stream is encoded and scrambled in the encoder and scrambler followed by demultiplexing in demultiplexer into separate streams. Next streams are subject to interleaving and mapping in a corresponding one of the interleaver mappers. Next all transmissions are spatially mapped with a spatial mapping matrix (SMM) in the spatial mapper. The spatially mapped streams from the spatial mapper are input to Inverse Discrete Fourier Transform (IDFT) components for conversion from the frequency to the time domain and subsequent transmission in the AFT and RF stage.

An IDFT is coupled to a corresponding one of the transmit path/chain components in the AFT RF stage for wireless transmission on an associated one of MIMO antenna. Specifically each IDFT couples to an associated one of the digital-to-analog converters (DAC) 550 for converting the digital transmission to analog, filters, upconverters, coupled to a common voltage controlled oscillator (VCO) for upconverting the transmission to the appropriate center frequency of the selected channel(s), and power amplifiers for setting the transmit power level of the transmission on the MIMO antenna array.

The receive path/chain includes the following discrete and shared components. Received communications on the WAP's array of MIMO antenna are subject to RF processing including downconversion in the AFE-RF stage. There are six receive paths each including the following discrete and shared components: low noise amplifiers (LNA) for amplifying the received signal under control of an analog gain control (AGC) (not shown) for setting the amount by which the received signal is amplified, downconverters coupled to the VCO for downconverting the received signals, filters for bandpass filtering the received signals, analog-to-digital converters (ADC) for digitizing the downconverted signals. In an example implementation, an optional sampler 568 at the output of the ADCs allows sampling of the received WiFi signals in the time domain, for subsequent WiFi spatial diagnostics by the processor and non-volatile memory. The digital output from each ADC is passed to a corresponding one of the discrete Fourier transform (DFT) components in the baseband portion of the WiFi stage for conversion from the time to the frequency domain.

Receive processing in the baseband stage includes the following shared and discrete components including: an equalizer to mitigate channel impairments which is coupled to the output of the DFTs. In an example implementation, the received WiFi signals in the frequency domain from the output of the DFTs either with or without equalization are provided to the processor and non-volatile memory. The received WiFi streams at the output of the equalizer are subject to demapping and deinterleaving in a corresponding number of the demappers and deinterleavers. Next the received stream(s) are multiplexed in multiplexer and decoded and descrambled in the decoder and descrambler component, followed by de-framing in the deframer. The received communication is then passed to the WMAC component where it is decrypted with the decryption circuit and placed in the appropriate upstream hardware queue for upload to the Internet.

A non-transitory computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

A computing device can be communicatively coupled to input/user interface and output device/interface. Either one or both of input/user interface and output device/interface can be a wired or wireless interface and can be detachable. Input/user interface may include any device, component, sensor, or interface, physical or virtual, that can be used to provide input (e.g., buttons, touchscreen interface, keyboard, a pointing/cursor control, microphone, camera, braille, motion sensor, optical reader, and/or the like).

The term "communicatively connected" is intended to include any type of connection, wired or wireless, in which data may be communicated. The term "communicatively connected" is intended to include, but not limited to, a connection between devices and/or programs within a single computer or between devices and/or separate computers over the network. The term "network" is intended to include, but not limited to, packet-switched networks such as local area network (LAN), wide area network (WAN), TCP/IP, (the Internet), and can use various means of transmission, such as, but not limited to, WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

Further, some example implementations of the present application may be performed solely in hardware, whereas other functions may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

The example implementations may have various differences and advantages over related art. Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:
1. A method comprising:
receiving, by a second access point, a sounding trigger broadcast by a first access point, while opportunistically monitoring for triggers without coordination with the first access point;
receiving, by the second access point, a first dedicated training signal from a first station in response to the sounding trigger broadcast by the first access point without the second access point sending a separate sounding trigger to the first station; and
generating, by the second access point, channel characteristics of a channel based on the first dedicated training signal, the channel including a forward channel between the second access point and the first station.
2. The method of claim 1, further comprising transmitting packets over the channel from the second access point to the first station, the packets precoded using precoding derived from the channel characteristics.

3. The method of claim 1, further comprising:
transmitting a second dedicated training signal from the second access point to the first station;
receiving, by the second access point, feedback from the first station in response to the second dedicated training signal; and
calibrating beamforming between the second access point and the first station based on analysis of a first channel estimation based on the channel characteristics and a second channel estimation based on the received feedback.

4. The method of claim 1, further comprising:
receiving, by the second access point, a second dedicated training signal from a second station in response to the sounding trigger broadcast by the first access point; and
generating, by the second access point, second channel characteristics of a second channel based on the second dedicated training signal, the second channel including a second forward channel between the second access point and the second station.

5. The method of claim 4, wherein the first dedicated training signal and the second dedicated training signal are multiplexed and at least partially overlapping in time based on information in the sounding trigger.

6. The method of claim 4, wherein the first dedicated training signal and the second dedicated training signal are received sequentially in time based on information in the sounding trigger.

7. The method of claim 1, wherein the sounding trigger includes training options for the first station to format the first dedicated training signal including at least one of: repeated symbols to be included in the first dedicated training signal, partial bandwidth to be used when transmitting the first dedicated training signal, a number of bits to be included in the first dedicated training signal, and a schedule according to which the first station is to transmit additional dedicated training signals.

8. A system comprising:
one or more processors; and
one or more non-transitory computer-readable media containing instructions that, when executed by the one or more processors, are configured to cause the system to perform operations, the operations comprising:
receiving a sounding trigger broadcast by a first beamformer, the system acting as a second beamformer;
reserving, by the second beamformer, network resources identified by the first beamformer in the sounding trigger via which a first beamformee is instructed to transmit a first dedicated training signal;
receiving, by the second beamformer, the first dedicated training signal from the first beamformee via the reserved network resources, the first dedicated training signal transmitted by the first beamformee in response to the sounding trigger broadcast by the first beamformer; and
generating, by the second beamformer, channel characteristics of a channel based on the first dedicated training signal, the channel including a forward channel to the first beamformee.

9. The system of claim 8, wherein the operations further comprise transmitting packets to the first beamformee, the packets precoded using precoding derived from the channel characteristics.

10. The system of claim 8, wherein the operations further comprise:

transmitting a second dedicated training signal to the first beamformee;
receiving feedback from the first beamformee in response to the second dedicated training signal; and
calibrating beamforming for the forward channel to the first beamformee based on analysis of a first channel estimation based on the channel characteristics and a second channel estimation based on the received feedback.

11. The system of claim 8, wherein the operations further comprise:
receiving a second dedicated training signal from a second beamformee in response to the sounding trigger broadcast by the first beamformer; and
generating second channel characteristics regarding a second channel based on the second dedicated training signal, the second channel including a second forward channel to the second beamformee.

12. The system of claim 11, wherein the first dedicated training signal and the second dedicated training signal are multiplexed and at least partially overlapping in time based on information in the sounding trigger.

13. The system of claim 11, wherein the first dedicated training signal and the second dedicated training signal are received sequentially in time based on information in the sounding trigger.

14. The system of claim 8, wherein the operations further comprise receiving a message from the first beamformer establishing a master and slave relationship between the first beamformer and the system such that the first beamformer transmits the sounding trigger instead of the system.

15. The system of claim 8, wherein the sounding trigger includes training options for the first beamformee to format the first dedicated training signal including at least one of: repeated symbols to be included in the first dedicated training signal, partial bandwidth to be used when transmitting the first dedicated training signal, a number of bits to be included in the first dedicated training signal, and a schedule according to which the first beamformee is to transmit additional dedicated training signals.

16. An access point, comprising:
one or more processors; and
one or more non-transitory computer-readable media containing instructions that, when executed by the one or more processors, are configured to cause the access point to perform operations, the operations comprising:
opportunistically monitoring for triggers from a separate access point without coordination with the separate access point;
while opportunistically monitoring, observing a sounding trigger broadcast from the separate access point;
receiving a first dedicated training signal from a first station generated in response to the sounding trigger broadcast by the separate access point; and
generating first channel characteristics regarding a first channel based on the first dedicated training signal, the first channel including communication between the access point and the first station.

17. The access point of claim 16, wherein the operations further comprise:
receiving a second dedicated training signal from a second station in response to the sounding trigger; and
generating second channel characteristics regarding a second channel based on the second dedicated training signal, the second channel including communication between the access point and the second station.

* * * * *